US011475083B1

(12) United States Patent
Yu et al.

(10) Patent No.: US 11,475,083 B1
(45) Date of Patent: Oct. 18, 2022

(54) ENHANCED SEARCH ENGINE TECHNIQUES UTILIZING THIRD-PARTY DATA

(71) Applicant: Amazon Technologies, Inc., Seattle, WA (US)

(72) Inventors: Sung Chan Yu, San Jose, CA (US); Sivaramharesh Siva, Seattle, WA (US); Brian Solloway, Seattle, WA (US); John Martin Gorski, Seattle, WA (US); Ky Le, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 16/438,208

(22) Filed: Jun. 11, 2019

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC .......................... G06F 16/9535; G06F 16/9538
See application file for complete search history.

(56) References Cited

U.S. PATENT DOCUMENTS

| | | | | |
|---|---|---|---|---|
| 2014/0052577 | A1* | 2/2014 | Gotlieb | G06Q 30/0619 705/26.44 |
| 2015/0017611 | A1* | 1/2015 | Moumneh | G09B 5/00 434/107 |
| 2015/0178786 | A1* | 6/2015 | Claessens | G06Q 30/0269 705/14.66 |
| 2017/0132497 | A1* | 5/2017 | Santos | G06K 9/6202 |
| 2019/0347689 | A1* | 11/2019 | Bullock | G06Q 30/0277 |

* cited by examiner

*Primary Examiner* — William B Partridge
*Assistant Examiner* — Aryan D Toughiry
(74) *Attorney, Agent, or Firm* — Kilpatrick Townsend & Stockton LLP

(57) ABSTRACT

Systems and methods are described herein for generating enhanced search results utilizing third-party website content within a search engine provided by an electronic catalog of a service provider. This content may be collected in advance of query processing and analyzed to identify a category indicating some attribute of the content (e.g., terms mentioned, topics discussed, object depicted in images/videos/3D data of the content, etc.). Items may be matched to the website through analyzing the textual and/or visual representation data of the website to textual and/or visual representation data associated with an item offered within the electronic catalog. A query may be subsequently received and a third-party website may be identified as being relevant to the search query. In response to the query, the third-party website may be included in a search result list along with images and/or text identifying items pertaining to that website.

20 Claims, 9 Drawing Sheets

ENHANCED SEARCH ENGINE TECHNIQUES UTILIZING THIRD-PARTY DATA

BACKGROUND

Search engines are powerful tools for locating information in a variety of contexts. For instance, a consumer in an electronic marketplace seeking to purchase a particular item may enter and submit one or more words, also known as keywords, describing the item, into an interface of a search engine in order to locate information about the item and/or purchase the item. The search engine may then provide the consumer with search results determined to be relevant, based at least in part on the keywords entered. The consumer may then search through the search results to locate what the consumer was looking for. The search results are provided to the consumer as a list or another format of items, with each item in the search result typically being represented by some amount of information regarding the item.

While search engines employ various methods for increasing the relevance of search results provided to people searching, current search techniques typically utilize data internal to the database being searched. If the user searches for keywords that are not referenced or similar to terms found within the data set on hand, the results provided can be inaccurate. This can lead to a frustrating experience for the user as he may be required to perform a lengthy and overly complicated process of performing a variety of searches, via a variety of search engines, to potentially find the data he seeks.

BRIEF DESCRIPTION OF THE DRAWINGS

Various embodiments in accordance with the present disclosure will be described with reference to the drawings, in which.

DETAILED DESCRIPTION

Figure 1:
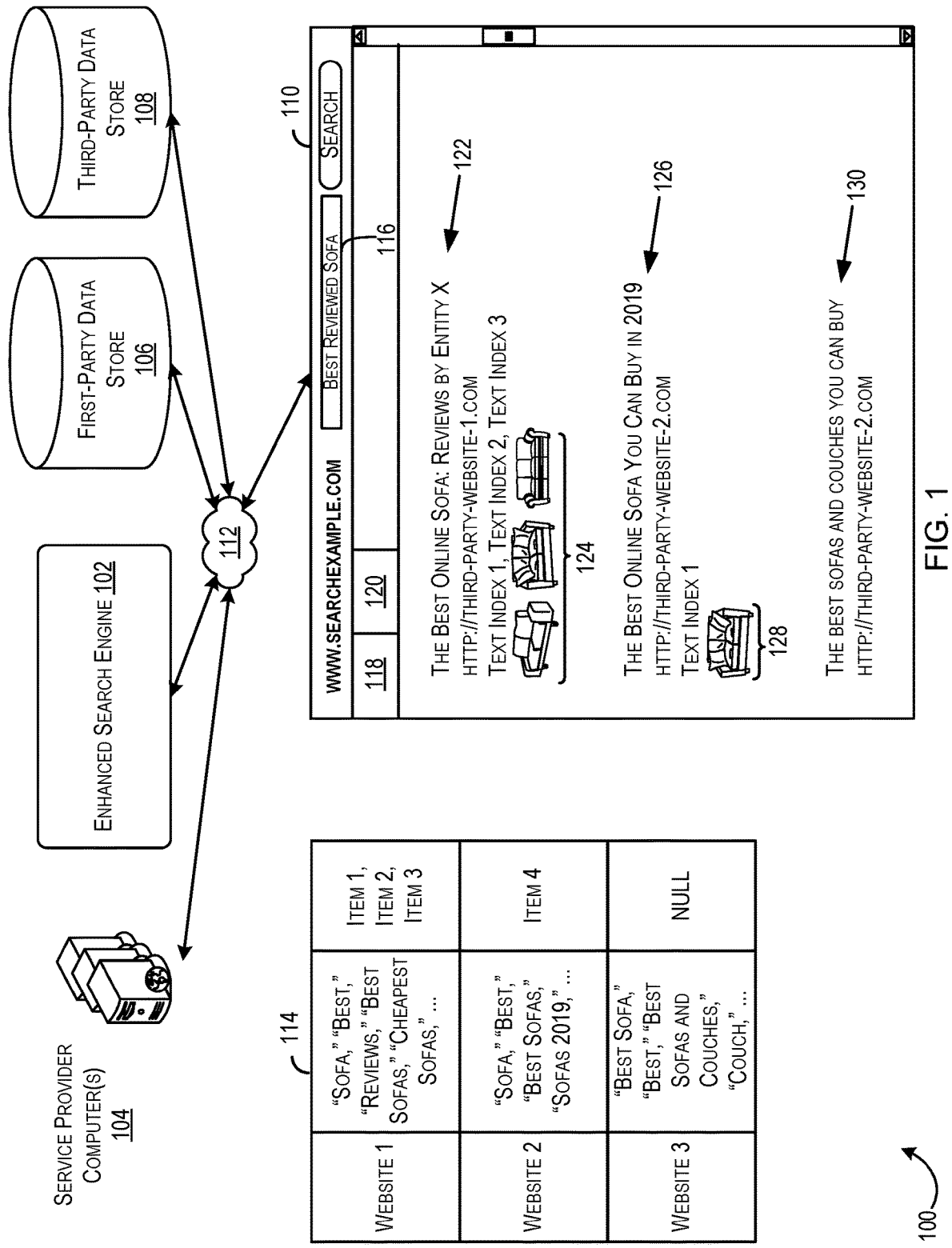
FIG. 1 illustrates an environment for utilizing features of an enhanced search engine, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to identifying relevant search results for a search query utilizing third-party content (e.g., content of third-party websites/network pages) and an enhanced search engine. It should be appreciated that any reference to a third-party website may similar be applied to a particular third-party web page. In some embodiments, the enhanced search engine may be provided by a first entity, such as a service provider that hosts an electronic catalog from which goods and/or services are proffered and obtained. Prior to receiving a search query, any suitable amount of website content may be obtained from a variety of third-party sources (e.g., third-party provider websites hosted on behalf of a third-party that is different from the service provider). As an example, these third-party sources may provide websites that provide consumer reports, reviews, or any suitable data that depicts, references, and/or relates to one or more items. The enhanced search engine may utilize any suitable technique to gather this information. For example, a web crawler or other suitable technique may be utilized to traverse third-party websites and/or to gather content of those websites (e.g., textual data and/or visual representations (also referred to as visual representation data) included within those websites, hyperlink data associated with hyperlinks presented within those websites, and the like). Visual representations data may include any suitable combination of one or more images, one or more videos, and/or any suitable 2-dimensional (2D) or 3-dimensional visual depictions. It should be appreciated that although many examples provided herein may utilize images for illustrative purposes, any suitable combination of one or more visual representations may similarly be utilized.

In some embodiments, the content of a third-party website may be utilized to identify one or more categories for that third-party website. As a specific example, textual and/or visual representation data of a third-party website that provides reviews for kitchen utensils may be obtained. Utilizing any suitable technique (e.g., language recognition techniques, image recognition techniques, video processing techniques, 3D modeling techniques, 2D to 3D techniques, 3D to 2D conversion techniques, etc.) the textual data and/or the visual representation may be determined to reference and/or depict one or more kitchen utensils. As a result, the enhanced search engine may be configured to categorize the website as relating to any suitable number of categories. For example, the website may be labeled with categories including, but not limited to, "kitchen utensils," "the best kitchen utensils of 2019," "kitchen mixers," "baking," and the like due to determining that the website references kitchen utensils and/or baking, depicts images of kitchen utensils, includes hyperlinks that link to kitchen utensils and/or mixers, or the like.

In some embodiments, any suitable combination of the textual data, visual representation, and hyperlinks included in the third-party website may be analyzed to further identify one or more items provided within the electronic catalog hosted on behalf of the service provider. By way of example, a hyperlink within the third-party website may be determined to link to a webpage (e.g., an item detail page) associated with a particular item offered within the electronic catalog. As another example, a visual representation of the third-party website may be analyzed utilizing any suitable visual representation analysis technique (e.g., image recognition techniques, video processing techniques, 2D/3D data conversions, and/or 3D modeling techniques) and compared to preexisting visual representations of a variety of items of the electronic catalog to identify that it depicts a particular item offered within the electronic catalog. As yet another example, textual data of the third-party website may be analyzed to identify that it describes and/or relates to a particular item offered within the electronic catalog (e.g., based on comparing the textual data to textual data associated with the item offered within the electronic catalog such as one or more item attributes associated with the item). Should a hyperlink, visual representation data, and/or textual data of the third-party website be identified as being related to a particular item, the third-party website may be associated with any suitable identifier and/or label that indicates the website relates to that particular item.

At a subsequent time, a user/designer may utilize a user interface provided on a website of the service provider (e.g., an interface hosted by the enhanced search engine) to submit a search query. The enhanced search engine may utilize the search query (e.g., "Best Kitchen Mixer") to identify a set of third-party websites (also referred to as "network pages") which may be relevant to the search query. By way of example, any suitable combination of one or more keywords of the search query may be utilized to identify one or more third-party websites that have been previously associated with a category that relates to those keywords. In the ongoing example, a third-party website may be previously associated with categories such as "kitchen mixers," and "the best kitchen utensils of 2019," among others. The enhanced search engine may be configured to determine that the categories "kitchen mixers," and/or "the best kitchen utensils of 2019" relate to the search query "Best Kitchen Mixer." If multiple third-party websites are associated with categories that are determined to relate to the search query, the enhanced search engine may rank these third-party websites according to a degree of relevancy (e.g., according to a relevancy score). The enhanced search engine may then identify a set one or more items that were previously associated for each relevant third-party website (e.g., spatula X, kitchen mixer Y, hotplate Z, etc.).

In some embodiments, the enhanced search engine may present, at an interface within the electronic catalog, a search result that includes an identifier (e.g., a URL) of the relevant third-party website adjacent to one or more images (e.g., thumbnails) depicted one or more images of the items to which the third-party website was determined to relate. In some embodiments, such as the example provided above, the enhanced search engine may further identify that only a subset of the items associated with the third-party website actually relate to the search query. By way of example, in a set of spatula X, kitchen mixer Y, and hotplate Z, the enhanced search engine may determine that only kitchen mixer Y relates to the search query "Best Kitchen Mixers." Accordingly, the enhanced search engine may present a visual representation of the kitchen mixer Y (e.g., a preexisting image, video, and/or 3D representation obtained from the electronic catalog that depicts kitchen mixer Y) adjacent to the identifier of the third-party website. From this search result, the user may utilize a number of interface elements to navigate to an item detail page corresponding to the kitchen mixer Y, or the user could utilize an interface element of the search result to navigate to the third-party website. These interface elements are discussed in more detail with respect to the following figures.

Utilizing the techniques discussed herein, the user's search experience is improved. Traditionally, the user's search query would have been utilized to search for items directly from the electronic catalog. This could produce inaccurate and/or irrelevant results if the query contained terms that are not included in item attributes of the items in the database. Thus, the query above might conventionally return a variety of kitchen mixers, with no consideration as to what the "best kitchen mixer" might be. However, the techniques discussed herein serve to identify third-party content that can be utilized to augment/supplement the query to identify more relevant search results than might otherwise be obtained. In the ongoing example, the third-party content can be utilized to more accurately identify what a "best kitchen mixer" might be (e.g., based on reviews provided in the third-party website) and, once identified, a search result that provides a link to the item within the electronic catalog may be provided to enable the user to identify and access data associated with the item in which he is interested.

Moving on to FIG. 1 which illustrates an environment 100 for utilizing features of an enhanced search engine 102, according to some embodiments. The environment may include service provider computer(s) 104, enhanced search engine 102, first-party data store 106, third-party data store 108, and any suitable user device (not depicted) capable of rendering interface 110 (e.g., via a web browser or other suitable application operating on the user device). The service provider computer(s) 104 may be operated by, or on behalf of a service provider that hosts an electronic catalog of items including goods (e.g., physical or digital goods) and/or services. Item information (e.g., any suitable textual data, visual representation data such as images/videos/3D representations of the item, item detail page information, and/or item attributes) related to the items offered within the electronic catalog may be stored in first-party data store 106, a data store configured to store such information and accessible to the service provider computer(s) 104 and/or the enhanced search engine 102. The service provider computer(s) 104 may further be configured to execute the enhanced search engine 102, although it should be appreciated that the enhanced search engine 102 could be executed by an electronic component that is different from the service provider computer(s) 104. The service provider computer(s) 104, the enhanced search engine 102, the first-party data store 106, and the third-party data store may be communicatively connected to one another via network(s) 112. The network(s) 112 may be any suitable local or wide area network (e.g., the Internet) with which data between these components may be exchanged.

As discussed above, prior to receiving a search query (e.g., search query 116 "Best Reviewed Sofa"), any suitable amount of website content may be obtained from a variety of third-party sources. These third-party sources may be different from the service provider. As a non-limiting example, these third-party sources may host websites that provide consumer reports, reviews, or any suitable data that potentially depicts, references, and/or relates to one or more items. The enhanced search engine 102 may gather website content (e.g., HTML code, textual data, visual representation data, hyperlink data, and the like) from third-party sources (e.g., via a web crawler or any suitable technique) and store this data in the third-party data store 108, a data store configured to store such information and that is accessible to the service provider computer(s) 104 and/or the enhanced search engine 102.

In some embodiments, the enhanced search engine 102 may analyze the content of a third-party website to identify one or more categories for that third-party website. For example, textual and/or visual representation data of a third-party website (e.g., website 1) that provides information identifying a number of sofas that were deemed by the third-party to be the bests sofas in the market at the time. The enhanced search engine 102 may utilize any suitable language recognition techniques to analyze the textual data of the third-party website to determine that it references and/or depicts one or more sofas, that it utilizes the terms "Best," "Reviews," and the like. In some embodiments, the enhanced search engine 102 may utilize any suitable visual representation analysis technique (e.g., image recognition techniques, video processing techniques, 2D/3D conversions, 3D modeling techniques) to analyze visual representation data of the third-party website to identify that one or more visual representations of the website depict one or more sofas.

In some embodiments, a machine-learning model previously trained with supervised learning techniques to identify an object (e.g., an item) within an input visual representation may be utilized. For example, the machine-learning model may be trained with images depicting known items to identify items in subsequent input images. In these examples, an image of the third-party website may be provided to the model and an output may be received from the model that identifies one or more items within the image. As another example, the machine-learning model may be trained with any suitable combination of visual representation data such as images, videos, 2D visual data, or 3D visual data depicting known items to identify items from subsequently provided visual representation data.

As another example, hyperlinks provided in the third-party website may be crawled to identify additional websites and the textual data and/or visual representation data provided on those websites may be further utilized to identify a category to be associated with the parent third-party website. By way of example, if a number of hyperlinks provided in the website link to websites that feature images of sofas and/or utilize terms like "Sofa," "Best Sofa of 2019," and the like, the website that featured the hyperlink may be associated with a category determined from the analysis of the content of the website to which the hyperlink is associated.

Utilizing the techniques discussed above, the enhanced search engine 102 may associated any suitable number of categories to each third-party website. By way of example, websites 1, 2, and 3 may be associated with the set of categories depicted at in table 114 of FIG. 1. The particular categories depicted in FIG. 1 are exemplary in nature. It should be appreciated that the categories utilized may be numerous and may vary depending on the context of the third-party content being categorized.

In some embodiments, any suitable combination of the textual data, visual representation data, and/or hyperlinks included in the third-party website may be analyzed by the enhanced search engine 102 to further identify one or more items provided within the electronic catalog hosted on behalf of the service provider (e.g., the item information stored within the first-party data store 106 including images, videos, 3D representations, item descriptions, product titles, reviews, item detail pages, or any suitable attribute of the item or data associated with the item). In some examples, a hyperlink within the third-party website may be determined to link to a webpage (e.g., an item detail page) associated with a particular item offered within the electronic catalog (e.g., an item detail page associated with a particular item of the electronic catalog stored in the first-party data store 106).

As another example, a visual representation of the third-party website may be analyzed utilizing any suitable visual representation analysis technique (e.g., image recognition techniques, video processing techniques, 2D/3D data conversions, 3D modeling techniques, etc.) and compared to preexisting visual representations of a variety of items of the electronic catalog to identify that the third-party website depicts a particular item offered within the electronic catalog. As yet another example, textual data of the third-party website may be analyzed to identify that it describes and/or relates to a particular item offered within the electronic catalog (e.g., based on comparing the textual data to textual data associated with the item offered within the electronic catalog such as one or more item attributes associated with the item and stored within the first-party data store 106). Should a hyperlink, visual representation data, and/or textual data of the third-party website be identified as being related to a particular item (e.g., with a confidence score over a particular threshold), the third-party website may be associated with any suitable identifier and/or label that indicates the website relates to that particular item. As a non-limiting example and as depicted in the table 114, website 1 may be associated with item 1, item 2, and item 3, website 2 may be associated with item 4, and website 3 may not be associated with any items (e.g., due to the textual and/or visual representation data of the website including data that was not determined to relate to any particular item and/or similar item found in first-party data store 106.

At a subsequent time, a user/designer may utilize a user interface provided on a website of the service provider (e.g., interface 110 hosted by the enhanced search engine 102 and/or the service provider computer(s) 104) to submit a search query. As a non-limiting example, a search query "best reviewed sofa" may be submitted via the interface element (e.g., an edit box of the interface 110). The enhanced search engine may utilize the search query to identify a set of third-party websites which may be relevant to the search query. By way of example, any suitable combination of one or more keywords of the search query may be utilized to identify one or more third-party websites (e.g., websites 1-3) that have been previously associated with a category that relates to those keywords.

In the ongoing example, the enhanced search engine 102 may be configured to execute any suitable relevancy scoring process to score a variety of websites (e.g., some or all of the websites of third-party data store 108) as having some degree of relevancy to the search query. In some embodiments, the third-party websites having a score under a threshold value may be excluded from a list of search results to be provided to the user via the interface 110. In still further embodiments, the third-party websites included in the search results may be ranked according to the relevancy score. The relevancy score may quantify an amount of similarity between one or more keywords of the search query and any suitable combination of the textual data, visual representation data, and/or hyperlink data of the third-party website. In the example depicted in FIG. 1, the website 1, 2, and 3 may be identified as being relevant to the search query "best reviewed sofas" as each mention terms such as "sofa," "best", "best sofa," and the like. In some embodiments, the website 1 may be rank higher in the list of search results based at least in part on having more terms that are similar to the search query than websites 2 and 3. The website may be additionally or alternatively ranked higher than the other websites based at least in part on included a greatest number of items (e.g., item 1, 2, and 3) and/or a greatest number of items that are also deemed to be relevant to the search query. By way of example, the website 1 may be assigned a higher ranking than websites 2 and 3 based on being associated with 3 items and/or based on being associated with 3 items that individually are deemed to be related to one or more keywords of the search query. While website 2 is ranked lower than website 1 due to being associated with only 1 item (or 1 item that is deemed relevant to the search query) and website 3 is ranked lowest in the set due to lacking any association with an item (at all or an item associated with the one or more keywords of the search query).

It should be appreciated that, in some embodiments, information associated with the user (or many users of the electronic catalog) may be utilized, at least in part, to calculate a relevancy score. By way of example, historical data such as past purchase information, browsing data indicating searches and/or viewed items, shopping cart data indicating items placed in a shopping cart, saved items and/or wish list items, return order history, or any suitable user interaction with the electronic catalog and/or features thereof may be utilized, at least in part, to calculate a relevancy score between a search query and an item. As a simplistic example, when the user has previously viewed particular item detail pages within the electronic catalog, that information may be utilized to calculate a higher relevancy score for third-party websites that depict those items. Similarly, a third-party website may be associated with a relatively higher relevancy score when it depicts an item that is similar (e.g., the same brand) as one or more items purchased by the user in the past. Historical data associated with other users of the electronic catalog may be utilized in a similar manner. For example, third-party website may be deemed more relevant to some degree when they depict items that are more popular in the electronic catalog than others (e.g., items that are viewed more often than other items, items that are purchased more often than others, etc.). In a similar manner, when a third-party website depicts one or more items that are often returned (e.g., by the user and/or other users of the electronic catalog), the relevancy score may be negatively affected (e.g., lowered) to some degree. By utilizing this additional data to calculate the relevancy score, the system is configured to further tailor the search results to rank third-party web sites higher or lower to some degree based on a determination that they depict similar items with which the user(s) have interacted previously. These techniques can provide a more accurate assessment of relevancy than if that data was not used.

In some embodiments, the enhanced search engine 102 may present different search results based at least in part on an option selected by the user. As a non-limiting example, the search query may be utilized in a conventional manner to identify a set of items within the electronic catalog based solely on the search query and traditional techniques of identifying relevant search query results. These traditional search results may be provided on a tab (or separate page) within interface 110 and the user may opt to view these search results by selecting option 118 (e.g., a tab, a link, a button, etc.). Additionally, or alternatively, the enhanced search engine 102 may utilize third-party data in addition to the search query to identify a search result list. The search results identified utilizing the search query in conjunction with third-party data (e.g., such as the third-party data stored in the third-party data store 108, the data provided in table 114, etc.) may be provided on a separate tab (or separate page) within the interface 110 and the user may opt to view these search results by selecting option 120. Accordingly, in some embodiments, the enhanced search engine 102 may present enhanced search results (e.g., search results obtained utilizing the search query and third-party data to identify items within the electronic catalog) that are separate and distinct from traditionally obtained search results (e.g., search results obtained utilizing the search query alone to identify items within the electronic catalog).

By way of example, upon selecting option 120 (or by default) the search result list provided in response to the query "best reviewed sofa" may include websites 1, 2, and 3. Based at least in part on the corresponding relevancy score for each website, the websites may be ranked within the interface 110. By way of example, information regarding website 1 may be listed in a higher position in the search result list than information corresponding to websites 2 and 3, respectively. As depicted, each search result list entry may include an identifier (e.g., a URL) of the relevant third-party website adjacent to one or more images (e.g., thumbnails) depicted one or more images of the items to which the third-party website was determined to relate. Additionally information such as an identifier for the depicted images may be provided in the search result list entry. It should be appreciated that the use of images within the search result list entry is intended to be illustrative and that any suitable visual representation or combination of visual representations may be similarly utilized (e.g., image(s), video(s), 3D models, etc.).

In some examples, website 1 may be appear in a top-most entry of the search result list at 122. The search result list entry at 122 may include an identifier of a topic of the website (e.g., a title of an article contained within the website, etc.), an identifier of the website 1 (e.g., website 1's URL), one or more identifiers of one or more items (e.g., one or more textual identifiers and/or one or more visual representations of the one or more items). In the example depicted in FIG. 1, three textual identifiers and three images identifying items 1, 2, and 3 may be depicted within area 124, an area adjacent to the information associated with the website 1. The textual identifiers may be any suitable attribute associated with the item (e.g., an item name corresponding to the item's visual representation, in this case an image). In some embodiments, the textual identifiers may not appear with the visual representations provided in area 124.

Thus, the enhanced search engine 102 may utilize third-party data (content found on third-party websites/network pages) along with item information provided in the first-party data store 106 and the search query to identify a set of search results that more accurately identify items corresponding to the search query from the electronic catalog than if traditional searching techniques were to be utilized alone. In some embodiments, the enhanced search engine 102 may also provide more traditional search results (e.g., search results that were determined utilizing the item information contained in the first-party data store 106 and the search query without the user of third-party data) within the interface 110, enabling the user to view both types of search results depending on his needs.

Figure 2:
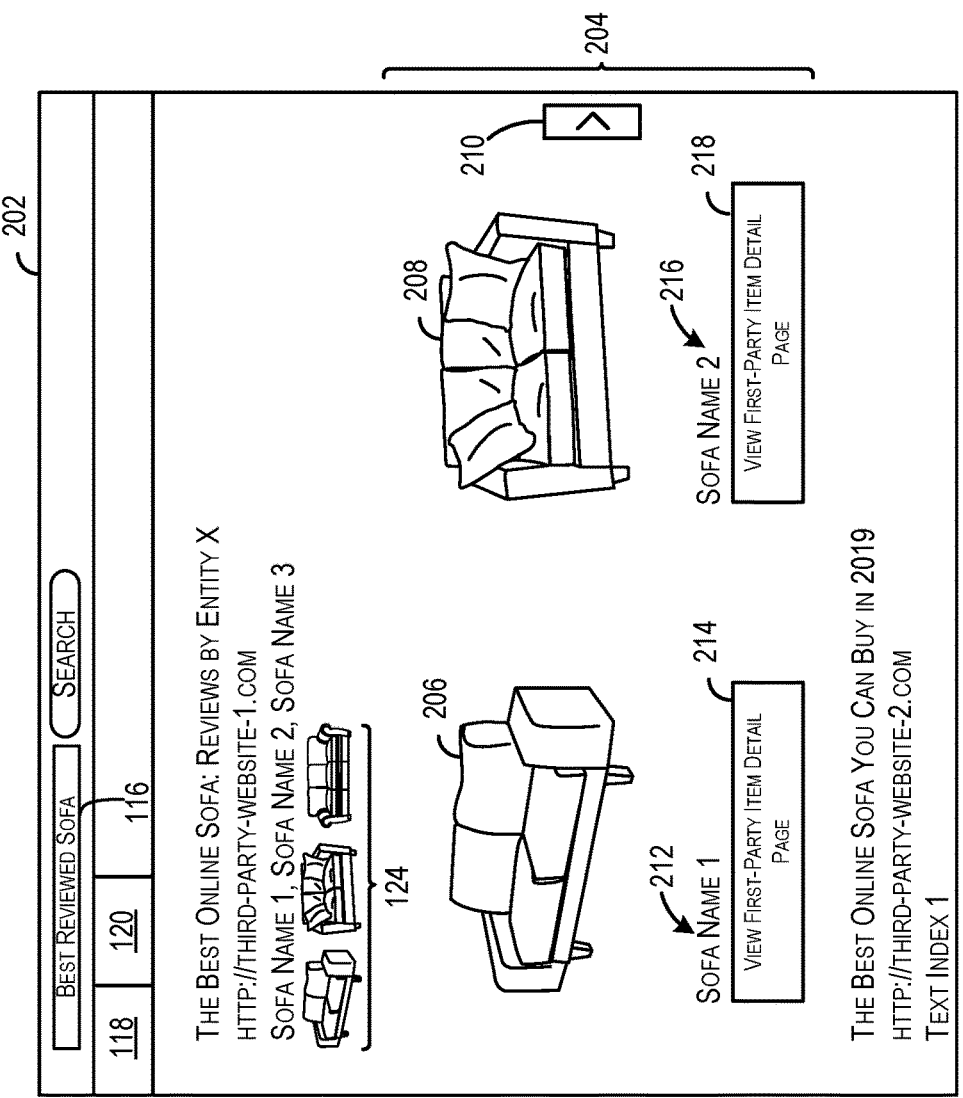
FIG. 2 illustrates an example interface for providing search results, according to some embodiments.
Figure 2:
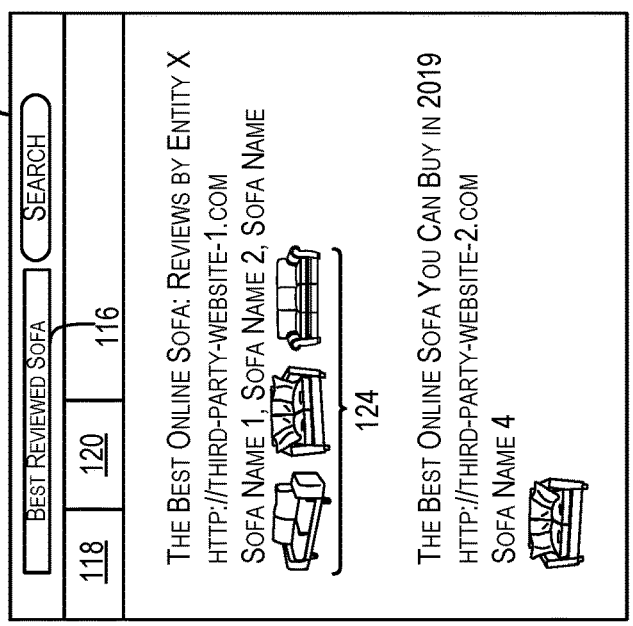

FIG. 2 illustrates example interfaces (e.g., the interface 110 of FIG. 1, the interface 202) for providing search results, according to some embodiments. The interface 202 may be an example of an altered version of the interface 110 of FIG. 1. A set of search results may be identified and provided utilizing the enhanced search techniques described above in connection with the enhanced search engine 102. The interface 110 may provide an initial view of these search results.

As described above, each search result entry corresponding to a third-party website which has been determined to relate to one or more items within the electronic catalog may include visual representations (e.g., images, videos, and/or 3D models) of the one or more items within the area 124 (e.g., an area adjacent to the search result information corresponding to the particular third-party website). Although the area 124 is depicted as being below the other search result information identifying the third-party website, it should be appreciated that the area 124 may be different situated with respect to the other search result information identifying the third-party website. For example, the area 124 may appear above or to the side of its corresponding search result information. Any suitable number of visual representations may be provided within the area 124 in a grid like fashion, via a graphical carousel that initially provides a subset of the items that may be navigated through (e.g., swiped through, scrolled through, etc.), or via any suitable graphical organization structure.

As depicted, options 118 and 120 are tabular options that, upon selection, present a different tab from which search results may be view. However, it is contemplated that options 118 and/or 120 may be differently provided. By way of example, the interface 110 may include a radio button or other suitable selection type interface element with which the user may select to view traditional search results and/or the search results obtained utilizing the enhanced searching techniques described herein. In some embodiments, it is contemplated that the traditional search results and the search results obtained utilizing the enhanced search techniques described herein (also referred to as enhanced search results) may be provided simultaneously via a same webpage either as being visually separated (e.g., in two subareas of an area utilized to generally present search results) and/or intermingled within a common search result list according to some predetermine combination scheme (e.g., one or more rules that identify how traditional search results and enhanced search results are to be combined into a common search result list). It should be appreciated that, if combined, the enhanced search results may be weighed as being more relevant to the given search query than the traditionally obtained search results and thus, the enhanced search result entries may appear in higher positions on the search result list than the traditional search result entries.

In some embodiments, the interface 110 may include the visual representations (as depicted, images) with area 124. Upon selecting any suitable visual representation within the area 124, the interface 110 may be altered to present the interface 202. Within the interface 202, the visual representations with area 124 may be enlarged (e.g., to a predetermined degree) and provided within area 204. Enlarging the visual representations may cause the remaining entries of the search result list to be visually shifted downward to allow room for the area 204 to be presented while allowing the remaining search result entries to be visible. If the search results are shifted downward, it should be appreciated that one or more search results may be shifted to such an extent as to be no longer be visible within the window of the interface 202. In these examples, the user may utilize any suitable scrolling and/or navigational feature of the interface 202 to scroll downward to once again view the shifted search result entries.

The area 204, as depicted in FIG. 2, may include a graphical carousel in which at least one of the items originally depicted in area 124 may be viewed. In some embodiments, the user may swipe or navigate to the left or right to view additional visual representations of items associated with the third-party website. In some embodiments, any one of the visual representations within area 124 may be selected and the images enlarged and presented as depicted in interface 202. By way of example, even though three item visual representations may have been presented within area 124, as enlarged, only two of the item visual representations may be viewable within the area 204. For example, an image 206 corresponding to a first image provided within area 124 and an image 208 corresponding to a second image provided within the area 124 may be presented within area 204. Should the user desire to see additional visual representations originally provided within area 124, the user may swipe to the left and/or selection navigational button 210 to slide the images 206 and 208 to the left to present image 208 and the image of a third item within the area 204.

According to some embodiments, one or more additional interface elements may be included with each visual representation presented within the area 204. By way of example, the image 206 (e.g., corresponding to "item 1," a particular sofa) may be presented with a textual identifier 212 (e.g., a name of the sofa) and/or a navigational component 214. The navigational component 214 may include a button (as depicted), a hyperlink, or any suitable interface element that, upon selection, may navigate the user to an item detail page provided within the electronic catalog and associated with the item depicted in image 206. Similarly, the image 208 (e.g., corresponding to "item 2," a different sofa) may be presented with a textual identifier 216 (e.g., a name of the sofa) and/or a navigational component 218. The navigational component 218 may include a button (as depicted), a hyperlink, or any suitable interface element that, upon selection, may navigate the user to an item detail page provided within the electronic catalog and associated with the item depicted in image 216. In some embodiments, the item identifiers (e.g., the item names and/or item visual representations presented at 220 may be hidden and/or replaced with the content of the area 204 upon selection of any of the visual representations within area 124. However, in some embodiments, the content of area 124 may be presented as depicted in FIG. 2, as being adjacent to the content of area 204. In some embodiments, the area 204 may include an interface element (e.g., an x box, or any suitable interface element not depicted here) which may be utilized to remove the area 204 from interface 202 and revert to the depiction of the search result entry as provided in interface 110.

Figure 3:
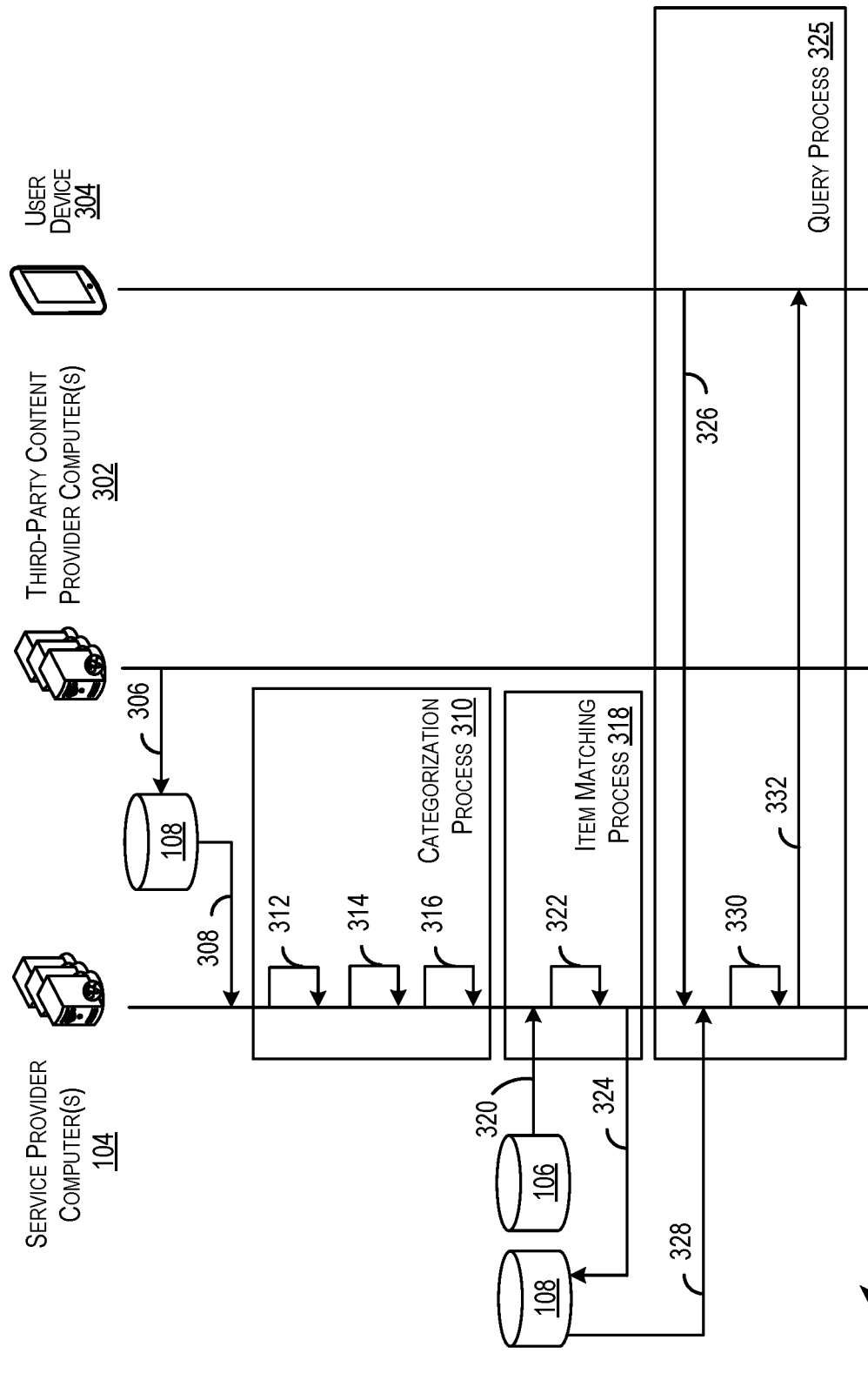
FIG. 3 illustrates a flow for utilizing third-party content to identify a set of search results within an electronic catalog, according to some embodiments.

FIG. 3 illustrates a flow 300 for utilizing third-party content to identify a set of search results within an electronic catalog, according to some embodiments. The operations performed in the flow may include the service provider computer(s) 104 of FIG. 1, third-party content provider computer(s) 302 (e.g., third-party sources of third-party websites/content), and a user device 304.

The flow 300 may begin at 306, where third-party content may be collected from the third-party content provider computer(s) 302. The third-party content provider computer(s) 302 may include news outlet websites, consumer report websites, social media websites, product review websites, or any suitable website provided by any suitable entity that is different from the service provider that manages the online electronic catalog of items discussed herein. In some embodiments, the service provider computer(s) 104 may execute any suitable technique for collecting such data. By way of example, the service provider computer(s) 104 may execute a web crawler on a predetermined or user-defined list of websites on a periodic basis and/or accordingly to a schedule. As a non-limiting example, the service provider computer(s) 104 may cause a web crawler to crawl the third-party website hosted by the third-party content provider computer(s) 302 daily at a prescheduled time (e.g., 12:01 AM). The collected third-party content (e.g., textual data, visual representation data, hyperlinks, HTML code, etc.) may be stored in third-party data store 108. In some embodiments, the process for collecting third-party content performed at 306 may determine a particular third-party website does not allow for such data collection. Accordingly, the service provider computer(s) 104 may be configured to restrict data from such third-party websites from being collected.

At 308, the service provider computer(s) 104 may retrieve the third-party content collected at any suitable time, periodically, and/or according to a predetermined schedule.

Once third-party content is collected, or at any suitable time, the service provider computer(s) 104 may begin executing categorization process 310 to identify one or more categories for each third-party website corresponding to the third-party content contained in third-party data store 108. For example, at 312, the service provider computer(s) 104 may be configured to analyze any suitable portion of textual data provided within the third-party content. This textual data may include any suitable text provided in the body of the third-party content, the text utilized within a URL associated with the third-party website from which the content was obtained, and the like. The service provider computer(s) 104 (e.g., or the enhanced search engine 102, a component of the service provider computer(s) 104) may utilize any suitable language processing techniques (e.g., neural networks, machine-learning models, recurrent neural networks, term/phrase identification, etc.) to analyze the textual data of the third-party website to determine a set of categories. In some embodiments, the textual data may be compared to a predetermined list of categories to identify that the textual data relates to a particular category from the list. In some examples, the one or more categories of third-party content may be dynamically generated from the textual data of the content. For example, particular words, phrases, or the like may be utilized to generate a label/identifier/category with which the third-party website from which the content was obtained may be associated.

At 314, the service provider computer(s) 104 (e.g., or the enhanced search engine 102, a component of the service provider computer(s) 104) may utilize any suitable visual representation analysis technique (e.g., image processing techniques, video processing techniques, 2D/3D data conversion techniques, 3D modeling techniques, etc.) to analyze visual representation data of the third-party website to identify categories related to the one or more images of the visual representation data. For example, any suitable image processing technique may be utilized to identify that an image depicts a particular object (e.g., a mountain, a sofa, a bottle of laundry detergent, a bicycle, etc.). In some embodiments, the image may be identified as depicting more than one object. In some embodiments, a machine-learning model previously trained with supervised learning techniques to identify an object within an input image may be utilized. For example, the machine-learning model may be trained with images depicting known items to identify items in subsequent input images. In these examples, an image of the third-party website may be provided to the model and an output may be received from the model that identifies one or more items within the image. In some embodiments, the service provider computer(s) 104 may maintain such a model, while in other embodiments, the service provider computer(s) 104 may submit the visual representation data to a model provided by another system/component and receive the output provided by the model. In some embodiments, the service provider computer(s) 104 may utilize the output as a label/identifier/category and associated the same with the third-party website from which the input image was obtained. It should be appreciated that, in some embodiments, the machine-learning model may be previously trained to identify items within a visual representation based at least in part on being trained utilizing visual representations for which depicted items were previously known.

As another example, at 316 the service provider computer(s) 104 (or the enhanced search engine 102, a component of the service provider computer(s) 104) may utilize content of the webpages/sites corresponding to hyperlinks provided in an initial third-party website to identify a category to be associated with the third-party website/page that featured the hyperlinks in the first place. By way of example, a hyperlink featured on website A may correspond to website B. Website B may provide additional textual data and/or visual representation data indicating that website B depicts and/or references information that is determined to be associated with category A. In some embodiments, the service provider computer(s) 104 may store an association between website B and category A. Additionally, the service provider computer(s) 104 may associate website A with category A as a result of website A featuring a hyperlink to website B which was determined to be associated with category A. The service provider computer(s) 104 may store associations between one or more third-party websites and one or more categories in any suitable storage location. In some embodiments, the one or more categories of each third-party website may be stored as an association with the third-party website in third-party data store 108.

In some embodiments, the service provider computer(s) 104 (or the enhanced search engine 102, a component of the service provider computer(s) 104) may execute an item matching process 318. In some embodiments, the item matching process 318 may include performing operations to identify one or more items of an electronic catalog to which the third-party content of the third-party data store 108 may relate.

As an example, at 320, the service provider computer(s) 104 may retrieve item information corresponding to one or more items provided in an electronic catalog associated with the service provider. The item information may be retrieved from the first-party data store 106 of FIG. 1. In some embodiments, the item information may include any suitable combination of visual representations depicting an item, item descriptions, product titles, reviews, item detail pages, or any suitable attribute of the item or data associated with the item of the electronic catalog.

At 322, the service provider computer(s) 104 may analyze the textual data, visual representation data, and/or hyperlinks of the third-party content to attempt to match such content to an item contained within the electronic catalog. By way of example, the service provider computer(s) 104 may determine that a hyperlink within the third-party website may link to a webpage (e.g., an item detail page) associated with a particular item offered within the electronic catalog (e.g., an item detail page associated with a particular item of the electronic catalog stored in the first-party data store 106). If so, the service provider computer(s) 104 may be configured to associate the third-party content with the particular item (e.g., by associating the third-party website with an item identifier corresponding to the item of the electronic catalog). As another example, the service provider computer(s) 104 may analyze an visual representation (e.g., an image) of the third-party website (e.g., utilizing any suitable visual representation analysis techniques) to compare the visual representation of the third-party website to preexisting visual representations (e.g., images, videos, 3D models, etc.) of a variety of items of the electronic catalog. In some embodiments, this may entail converting (e.g., from 2D to 3D, from 3D to 2D, etc.) the visual representation of the third-party website and/or the visual representation(s) of the item(s) of the electronic catalog in order to compare the two. If the service provider computer(s) 104 is able to match (e.g., at least over some degree of certainty) the visual representation of the third-party website to a visual representation of the item within the electronic catalog, the service provider computer(s) 104 may associate the third-party content with an item identifier corresponding to the item depicted in those visual representations. As yet another example, the service provider computer(s) 104 may analyze textual data of the third-party website to identify that the third-party website describes, references, and/or relates to a particular item offered within the electronic catalog (e.g., based on comparing the textual data to textual data associated with the item offered within the electronic catalog such as one or more item attributes associated with the item and stored within the first-party data store 106). If the service provider computer(s) 104 is able to match (e.g., at least over some degree of certainty) the textual data of the third-party website to textual data associated of the item of the electronic catalog, the service provider computer(s) 104 may associate the third-party content with an item identifier of the corresponding item. The service provider computer(s) 104 may maintain these associations in any suitable manner. As a non-limiting example, a mapping (e.g., as depicted at 114 of FIG. 1) may be maintained. In some embodiments, this mapping may include associations between a third-party website identifier, a set of categories (e.g., any suitable number of categories identified during categorization process 310), a set of items (e.g., any suitable number of item identified during item matching process 318), and the corresponding third-party website content.

It should be appreciated that, in some embodiments, an exact item match may not be discovered. In some embodiments, as part of the item matching process 318, the service provider computer(s) 104 may be configured to identify one or more items from the electronic catalog that may be similar to an item described and/or depicted in the third-party content. As a non-limiting example, the third-party content may depict an image (or other visual representation) of a sofa. If visual representation analysis techniques including image processing techniques (and/or video processing, 3D model techniques, etc.) did not identify an exact match to an item in the catalog, the service provider computer(s) 104 may perform an additional process for determining similar items. As a non-limiting example, the service provider computer(s) 104 may be utilized to identify an object (e.g., a couch, a table, a bedframe, etc.) and/or one or more attributes of the object depicted (e.g., a color, dimensions, a style, a fabric, etc.) from the third-party content (e.g., any suitable visual representation included in the third-party content). The service provider computer(s) 104 may then attempt to identify visual representations (e.g., images) of the electronic catalog that may depict items having similar attributes as the object depicted. In some embodiments, if an exact item match is not found but a number of similar items are identified, any suitable number of the similar items may be associated with the third-party website. In some embodiments, these similar items may be ranked according to any suitable similarity score that quantifies a degree of similarity between the object/attributes of the third-party visual representation of the item and the item attributes associated with the item of the electronic catalog.

In some embodiments, the service provider computer(s) 104 may be configured to filter one or more items from a set of similar items based at least in part on particular item attributes. For example, in some embodiments, the service provider computer(s) 104 may analyze textual data associated with the third-party content to identify that the content relates to a particular item type (e.g., furniture, sofas, nightstands, kitchen mixers, etc.) and/or a particular brand (e.g., brand X, brand Y, etc.). If so, any items that were included in the set of similar items that do not share these attributes may be filtered from the set before the items of the set are associated with the third-party website. As a non-limiting example, the service provider computer(s) 104 may determine that third-party content includes an image of a sofa that is determined, via analysis of the textual data surrounding the image, to depict a brand Z sofa. If the service provider computer(s) 104 compares the image to all of the images in the electronic catalog (or at least all of the sofa images within the catalog) and an exact match is not found, the service provider computer(s) 104 may analyze the image to identify one or more attributes and then search the catalog for images of items that share at least one of those attributes. A similar process may be performed should the third-party content utilize other visual representations such as videos and/or 3D data. In some embodiments, this may return a set of items having a variety of differing attributes. The service provider computer(s) 104 may be configured to remove any items from the set that are not the same product type (e.g., sofa) as the object depicted/referenced in the third-party website. Additionally, or alternatively, the service provider computer(s) 104 may be configured to remove any items from the set that are not the same brand (e.g., brand Z) as the object depicted/referenced in the third-party website. Accordingly, in some embodiments, only items that share a product type and/or brand may be included in the set of similar items then associated with the third-party website. It should be appreciated that product type and brand are utilized for illustrative purposes and that any suitable attribute(s) of the item may be utilized to filter the set of similar items prior to associating the set with the third-party website.

At 324, the service provider computer(s) 104 may store the exact item match association and/or the associations to the set of similar items to the third-party website in any suitable storage location. By way of example, an item identifier for the exact match and/or a set of identifiers for the similar items may be associated with the third-party website and stored in the third-party data store 108.

A query process 325 may subsequently be performed to identify relevance search results to a user-defined query.

At 326, a user/designer may utilize user device 304 (e.g., a laptop, a mobile phone, etc.) to access an user interface provided on a website of the service provider (e.g., interface 110 hosted by the enhanced search engine 102 and/or the service provider computer(s) 104) to submit a search query.

At 328, the service provider computer(s) 104 (or the enhanced search engine 102, a component of the service provider computer(s) 104) may retrieve the third-party content and/or any suitable associations between the corresponding third-party websites, one or more categories, one or more matched item identifiers, one or more similar item identifiers, or any suitable combination of the above.

At 330, the service provider computer(s) 104 may utilize the search query to identify a set of third-party websites which may be relevant to the search query. By way of example, any suitable combination of one or more keywords of the search query may be utilized to identify one or more third-party websites of the third-party data retrieved at 328 that have been previously associated with a category that relates to those keywords. The service provider computer(s) 104 may be configured to execute any suitable relevancy scoring process to score each of the websites according to the content retrieved from the third-party data store 108 as having some degree of relevancy to the search query. In some embodiments, the third-party websites having a score under a threshold value may be excluded from a list of search results to be provided in response to the query. In still further embodiments, the third-party websites included in the search results may be ranked according to the relevancy score. The relevancy score may quantify an amount of similarity between one or more keywords of the search query and any suitable combination of the textual data, visual representation data, and/or hyperlink data of the third-party website.

The service provider computer(s) 104 may be configured to rank a website as being more relevant to the query based at least in part on having more terms that are similar to the search query than other third-party websites. The website may be additionally or alternatively ranked higher than the other websites based at least in part on how many items (e.g., exact and/or similar) that are associated with the website (e.g., websites having a greater number of associated items receiving a higher ranking than those with a lesser number of associated items). In some embodiments, a relevancy between the associated items and the query may be additionally conducted and the relevancy of the third-party website with respect to the query may be altered based on the relevancy determined between the query and the items associated with the third-party website. Said another way, a third-party website having associations with two items that are also deemed to have a high degree of relevance with respect to the query may be ranked higher than a third-party website having two or more associations with items having a lower degree of relevance to the search query.

At 332, the service provider computer(s) 104 (or the enhanced search engine 102, a component of the service provider computer(s) 104) may search results including any suitable number of third-party websites and, if available, visual representations corresponding to any suitable number of related items references and/or depicted in those sites. This information may be presented via the interfaces 110 and/or 202 of FIGS. 1 and 2, respectively, in the manner described above.

Figure 4:
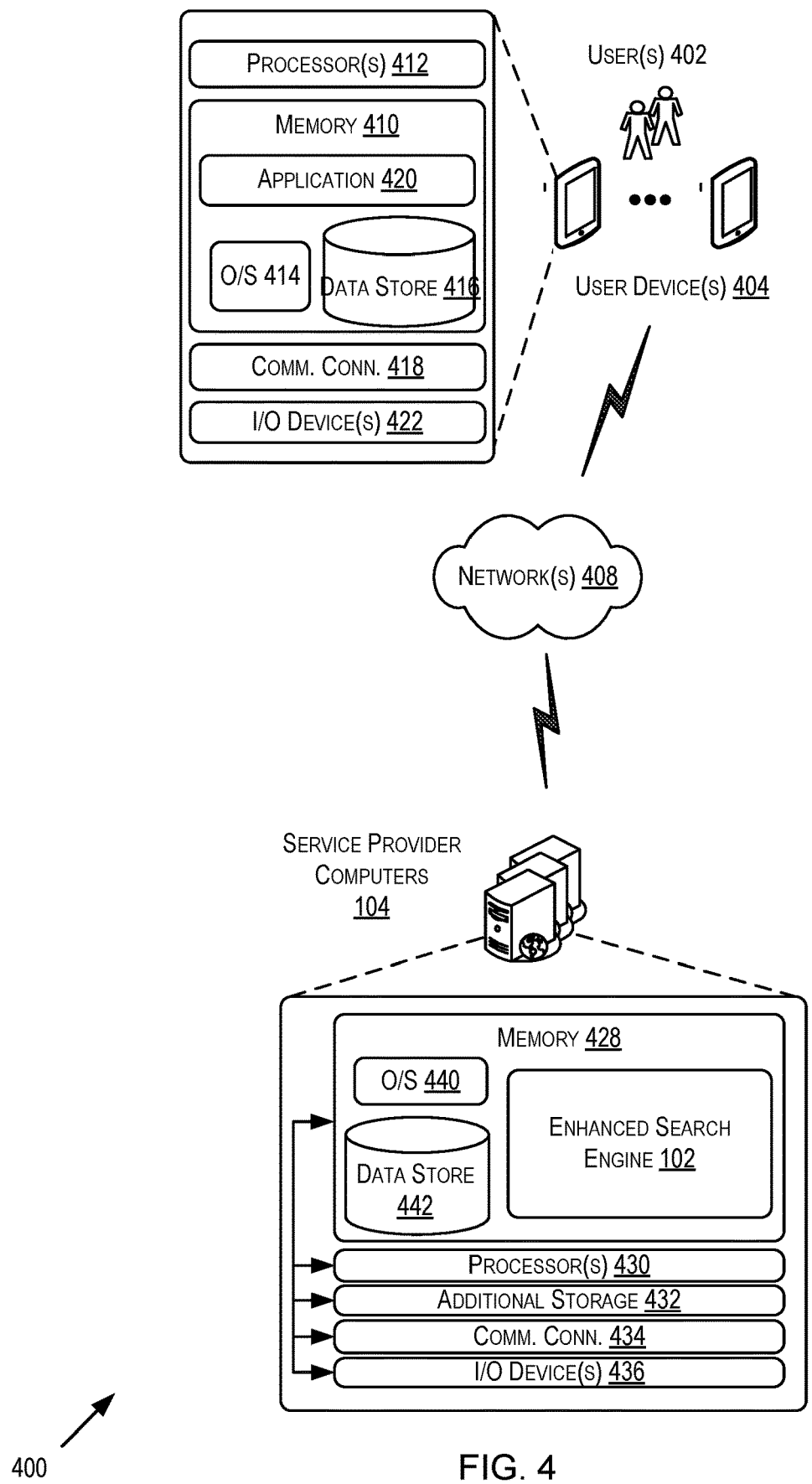
FIG. 4 illustrates exemplary components of search query system, according to some embodiments.

FIG. 4 illustrates exemplary components of search query system 400, according to some embodiments. In search query system 400, one or more user(s) 402 may utilize a user device (e.g., a user device of a collection of user device(s) 404 to navigate to a network page provided by the service provider computer(s) 104. The user device(s) 404 may individually be an example of the user device 304 of FIG. 3. The user device(s) 404 may be configured to provide any suitable interface such as the interfaces 110 and/or 202 of FIGS. 1 and 2, respectively via application 406 (e.g., a web browser, a shopping application, etc.). In some aspects, the application 406 operating on the user device(s) 404 may be hosted, managed, and/or provided by a computing resources service or service provider, such as by utilizing one or more service provider computer(s) 104.

In some examples, the network(s) 408 (e.g., the network(s) 112 of FIG. 1) may include any one or a combination of many different types of networks, such as cable networks, the Internet, wireless networks, cellular networks, and other private and/or public networks. While the illustrated example represents the user(s) 402 accessing application functionality over the network(s) 408, the described techniques may equally apply in instances where the user(s) 402 interact with the service provider computer(s) 104 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the enhanced search engine 102, discussed further below in more detail, may operate in whole or in part on the user device(s) 404. Thus, in some embodiments, the user(s) 402 may access the functionality of the enhanced search engine 102 directly through the user device(s) 404 and/or the service provider computer(s) 104 via user interfaces provided by the enhanced search engine 102.

In some embodiments, the application 406 may allow the user(s) 402 to interact with the service provider computer(s) 104 so as to provide the various functionality described above with respect to the enhanced search engine 102. For example, a user may utilize the application 406 to input a search query and to display search results provided by the enhanced search engine 102. In at least one example, the application 406 may provide a network page and/or user interfaces with which the user(s) 402 may view the interfaces 110 and/or 202, or any suitable interface to search for an item and/or display search results. The application 406 may be configured to transmit (electronically convey) the user's input(s) to the enhanced search engine 102, operating at the user device(s) 402 and/or the service provider computer(s) 104. The application 406 may further be configured to receive, process, and/or display any suitable data received from the service provider computer(s) 104 such as a resultant search result list.

The service provider computer(s) 104, perhaps arranged in a cluster of servers or as a server farm, may host the application 406 operating on the user device(s) 404 and/or cloud-based software services. Other server architectures may also be used to host the application 406 and/or cloud-based software services. The application 406 operating on the user device(s) 404 may be capable of handling requests from the user(s) 402 and serving, in response, various user interfaces that can be rendered at the user device(s) 404. The application 406 operating on the user device(s) 404 can present any suitable type of website that supports user interaction, including search engine sites, item detail pages, and the like. The described techniques can similarly be implemented outside of the application 406, such as with other applications running on the user device(s) 404.

The user device(s) 404 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 may be in communication with the service provider computer(s) 104 via the network(s) 408, or via other network connections.

In one illustrative configuration, the user device(s) 404 may include at least one memory 410 and one or more processing units (e.g., processor(s) 412). The processor(s) 412 may be implemented as appropriate in hardware, computer-executable instructions, firmware, or combinations thereof. Computer-executable instruction or firmware implementations of the processor(s) 412 may include computer-executable or machine-executable instructions written in any suitable programming language to perform the various functions described.

The memory 410 may store program instructions that are loadable and executable on the processor(s) 412, as well as data generated during the execution of these programs. Depending on the configuration and type of user computing device, the memory 410 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 410 may include multiple different types of memory, such as static random access memory (SRAM), dynamic random access memory (DRAM), or ROM.

Turning to the contents of the memory 410 in more detail, the memory 410 may include an operating system 414, one or more data stores 416, and one or more application programs, modules, or services for implementing the features of the enhanced search engine 102 disclosed herein, provided via the application 406 (e.g., a browser application, a shopping application, a search engine application, etc.). The application 406 may be configured to receive, store, and/or display a network page or other interface for interacting with the service provider computer(s) 104. Additionally, the memory 410 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device or server (e.g., the service provider computer(s) 104), user terminals and/or other devices on the network(s) 408. The user device(s) 404 may also include I/O device(s) 420, such as a keyboard, a mouse, a pen, a voice input device, a touch input device, a display, speakers, a printer, etc.

In some aspects, the service provider computer(s) 104 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 104 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 104 may be in communication with the user device(s) 404 and/or other service providers via the network(s) 408 or via other network connections. The service provider computer(s) 104 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 104 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 104, the memory 428 may be volatile (such as RAM) and/or non-volatile (such as ROM, flash memory, etc.). The service provider computer(s) 104 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 104 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 104 may also contain communications connection(s) 434 that allow the service provider computer(s) 104 to communicate with a stored database, another computing device or server, user terminals and/or other devices on the network(s) 408. The service provider computer(s) 104 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein, such as the features provided by the enhanced search engine 102.

Figure 5:
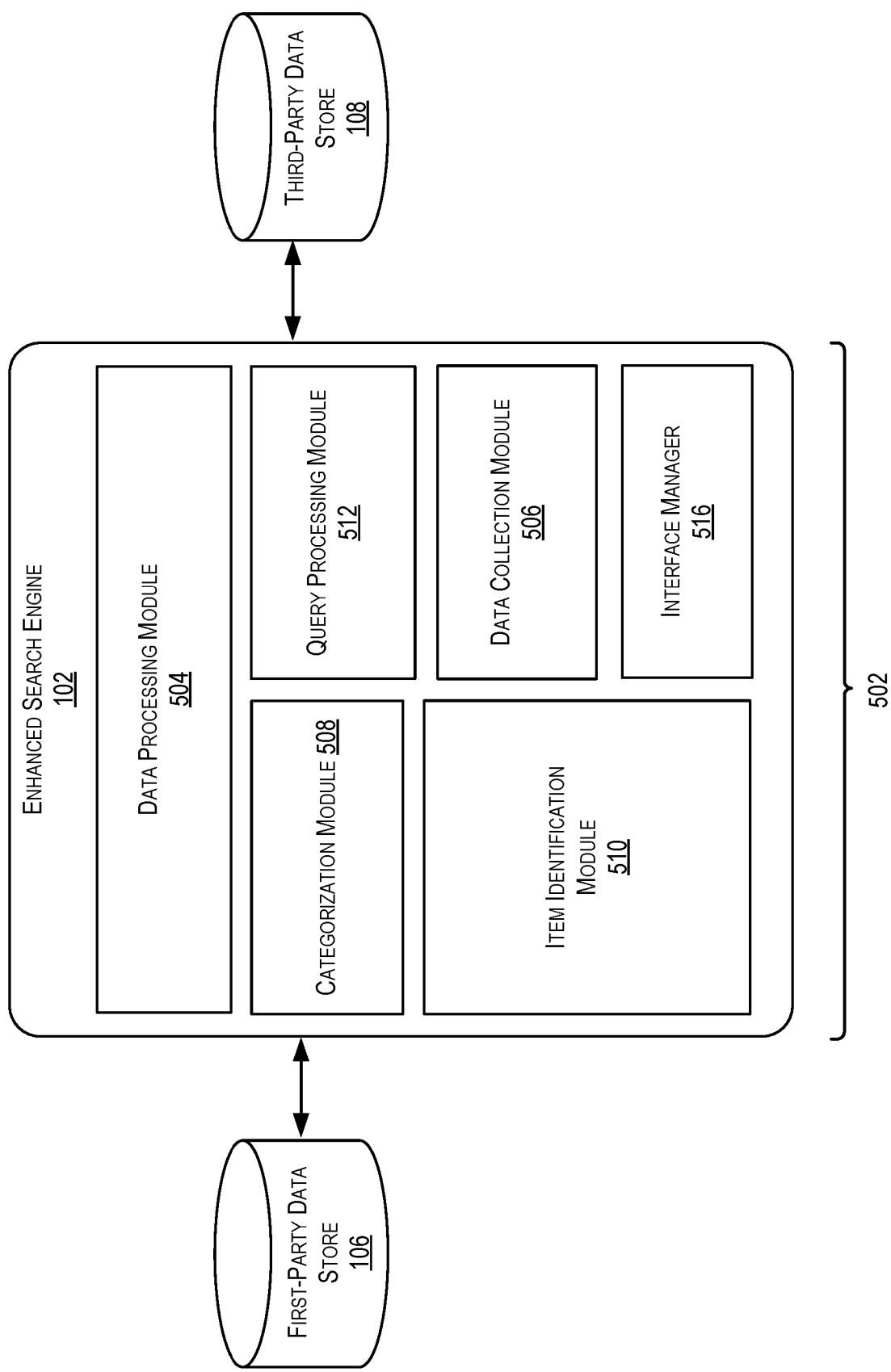
FIG. 5 is a schematic diagram of an example computer architecture for the enhanced search engine, including a plurality of modules that may perform functions in accordance with at least one embodiment.

FIG. 5 is a schematic diagram of an example computer architecture 500 for the enhanced search engine 102 of FIG. 1, including a plurality of modules 502 that may perform functions in accordance with at least one embodiment. The enhanced search engine 102 may be an example of the enhanced search engine 102 of FIG. 1. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502 may be exist as part of the enhanced search engine 102 operating on the service provider computer(s) 104 of FIG. 4, or the modules may exist as separate modules or services external to the service provider computer(s) 104 (e.g., as part of the application 406 of FIG. 4 operating on the user device(s) 404 of FIG. 4).

In the embodiment shown in the FIG. 5, the first-party data store 106 and the third-party data store 108 are shown, although data can be maintained, derived, or otherwise accessed from various data stores, either remote or local to the enhanced search engine 102, to achieve the functions described herein. In at least one embodiment, the data stores described herein may be physically located on the service provider computer(s) 104 of the figures above. The enhanced search engine 102, as shown in FIG. 5, includes various modules such as a data processing module 504, a data collection module 506, a categorization module 508, an item identification module 510, a query processing module 512, and an interface manager 516. Some functions of the modules 502 are described below. However, for the benefit of the reader, a brief, non-limiting description of each of the modules is provided in the following paragraphs. In accordance with at least one embodiment, one or more processes for identifying a set of search results utilizing third-party data in response to receiving a search query are provided.

In at least one embodiment, the enhanced search engine 102 includes the data processing module 504. Generally, the data processing module 504 may be utilized to receive any suitable information with respect to any example provided herein. The data processing module 504 may include any suitable number of application programming interfaces with which the functionality of the enhanced search engine 102 may be invoked.

In some embodiments, the data processing module 504 may be configured to receive content of one or more third-party websites (e.g., textual data, reviews, articles, blog content, social media posts, visual representations presented at the third-party websites, hyperlinks, and the like). The data processing module 504 may be configured to store the third-party data received within the third-party data store 108. The data processing module 504 may further be configured to receive user input provided via one or more user interfaces managed by the enhanced search engine 102 (e.g., by the interface manager 516 discussed below). The data processing module 504 may be configured to provide any suitable information received to any suitable combination of the remaining modules 502.

In some embodiments, the data processing module 504 may receive user input (e.g., a search query a user interface element selection, etc.) via a user interface provided by the interface manager 516 (e.g., the interface 110 and 202 of FIGS. 1 and 2, respectively). This user input may provide and/or identify particular data sets with which sentiments and/or feature combinations are to be identified. In some examples, the data processing module 504 may be configured to provide user input comprising a search query for further processing to the query processing module 512. User input including user interface element selection may be provided to the interface manager 516 for further processing. In some embodiments, third-party data may be provided to the data collection module 506 for further processing.

In some embodiments, the data collection module 506 may be configured to collect third-party data from a variety of third-party sources (e.g., third-party websites). The particular third-party sources from which data is to be collected may be defined in a predetermined list and/or the third-party sources may be user defined utilizing any suitable interface provided by the interface manager 516 (e.g., an interface that includes elements with which a user may specify particular websites from which third-party data is to be collected). In some embodiments, the data collection module 506 may be configured to collect third-party data according to a predetermined and/or user defined periodicity (e.g., daily, weekly, monthly, etc.), according to a predetermined and/or user-defined schedule, or the like. Such collection data may be provided by a user via any suitable interface provided by the interface manager 516. Any suitable data collected may be stored (e.g., by the data processing module 504 and/or by the data collection module 506 upon receipt) within the third-party data store 108.

In some embodiments, the data collection module 506 may be configured to collect the third-party data from the third-party content provider computer(s) 302 of FIG. 3. In some embodiments, these third-party content providers may include news outlet websites, consumer report websites, social media websites, product review websites, or any suitable website provided by any suitable entity that is different from the service provider associated with the service provider computer(s) 104 (e.g., a service provider that manages the online electronic catalog of items discussed herein). In some embodiments, the data collection module 506 may execute a web crawler on a predetermined or user-defined list of websites on a periodic basis and/or accordingly to a schedule. The collected third-party content (e.g., textual data, visual representation data, hyperlinks, HTML code, etc.) may be stored in third-party data store 108. In some embodiments, the data collection module 506 may determine (e.g., via an indicator associated with a third-party website) that a particular third-party website does not allow for such data collection. Accordingly, the data collection module 506 may be configured to restrict data from such third-party websites from being collected.

Once third-party content is collected, or at any suitable time, the data collection module 506 may stimulate the functionality provided by the categorization module 508. The categorization module 508 may be configured to execute a categorization process (e.g., the categorization process 310 of FIG. 3) to identify one or more categories for each third-party website corresponding to the third-party content contained in third-party data store 108. For example, the categorization module 508 may be configured to analyze any suitable portion of textual data provided within the third-party content. This textual data may include any suitable text provided in the body of the third-party content, the text utilized within a URL associated with the third-party website from which the content was obtained, and the like.

The categorization module 508 may utilize any suitable language processing techniques (e.g., neural networks, machine-learning models, recurrent neural networks, term/phrase identification, etc.) to analyze the textual data of the third-party website to determine a set of categories. In some embodiments, the textual data may be compared to a predetermined list of categories maintained by the categorization module 508 to identify that the textual data relates to a particular category from the list. In some examples, the one or more categories of third-party content may be dynamically generated by the categorization module 508 from the textual data of the content. For example, particular words, phrases, or the like may be utilized to generate a label/identifier/category with which the third-party website from which the content was obtained may be associated.

The categorization module 508 may be additionally or alternatively configured to utilize any suitable visual representation analysis technique (e.g., image recognition techniques, video processing techniques, 3D modeling techniques, 2D/3D conversion techniques, etc.) to analyze visual representations data of the third-party website to identify categories related to the one or more visual representations. For example, any suitable image processing technique (an example of a visual representation analysis technique) may be utilized to identify that an image depicts a particular object (e.g., a mountain, a sofa, a bottle of laundry detergent, a bicycle, etc.). In some embodiments, the image may be identified as depicting more than one object. In some embodiments, a machine-learning model previously trained with supervised learning techniques to identify an object within an input image may be utilized. For example, the machine-learning model may be trained with images depicting known items to identify items in subsequent input images. The machine-learning model may be generated, trained, and maintained by the categorization module 508 or the machine-learning model may be accessible to the categorization module 508 but provided by a separate system and/or service. The categorization module 508 may provide an image of the third-party website to the model (e.g., locally or via a predetermine application programming interface) and an output may be received from the model that identifies one or more items within the image. In some embodiments, the categorization module 508 may utilize the output as a label/identifier/category and associated the same with the third-party website from which the input image was obtained. In some embodiments, the label/identifier/category association may be maintained within the third-party data store 108 as an association to the third-party content and/or an identifier of third-party website (e.g., a URL of the third-party website). It should be appreciated that the machine-learning model may be generated, trained, and maintained by the categorization module 508 to similarly utilize any suitable combination of visual representation data (e.g., images, videos, 3D data such as 3D models, or the like) to identify items from any type of visual representation provided as input. Accordingly, any suitable type of visual representation may be provided to the model in order to receive output identifying the items depicted in the visual representations provided.

In some embodiments, the categorization module 508 may utilize content of the webpages/sites corresponding to hyperlinks provided in an initial third-party website to identify a category to be associated with the third-party website/page that featured the hyperlinks in the first place. By way of example, the categorization module 508 may identify that a hyperlink featured on website A may correspond to website B. The content of website B may be analyzed by the categorization module 508 utilizing the language processing techniques and/or visual representation analysis techniques (e.g., image processing techniques, video processing techniques, 3D modeling techniques, 2D/3D conversion techniques, etc.) and/or the machine-learning model output to identify that website B depicts and/or references information that is determined to be associated with category N. In some embodiments, the categorization module 508 may store an association between website B and category N (e.g., within the third-party data store 108). Additionally, the categorization module 508 may further be configured to associate website A with category N as a result of website A featuring a hyperlink to website B which was determined to be associated with category N. The categorization module 508 may store associations between one or more third-party websites and one or more categories in any suitable storage location. In some embodiments, the one or more categories of each third-party website may be stored as an association with an identifier of the third-party website within third-party data store 108.

In some embodiments, the item identification module 510 may be configured to execute an item matching process (e.g., the item matching process 318 and FIG. 3). In some embodiments, the item matching process may include performing operations to identify one or more items of an electronic catalog to which the third-party content of the third-party data store 108 may relate.

For example, the item identification module 510 may retrieve item information corresponding to one or more items provided in an electronic catalog associated with the service provider. The item information may be retrieved from the first-party data store 106. In some embodiments the item information may include any suitable combination of visual representations depicting an item, item descriptions, product titles, reviews, item detail pages, or any suitable attribute of the item or data associated with the item of the electronic catalog. The item identification module 510 may analyze the textual data, visual representation data, and/or hyperlinks of the third-party content to attempt to match such content to an item contained within the electronic catalog. By way of example, the item identification module 510 may determine that a hyperlink within the third-party website may link to a webpage (e.g., an item detail page) associated with a particular item offered within the electronic catalog (e.g., an item detail page stored in the first-party data store 106 and associated with a particular item of the electronic catalog). If so, the item identification module 510 may be configured to associate the third-party content with the particular item (e.g., by associating the third-party website with an item identifier corresponding to the item of the electronic catalog). As another example, the item identification module 510 may analyze an image of the third-party website (e.g., utilizing any suitable image processing techniques) to compare the image of the third-party website to preexisting images of a variety of items of the electronic catalog (e.g., any suitable number of preexisting images stores in the first-party data store 106 as part of the item information associated with any suitable number of items of the electronic catalog). If the item identification module 510 is able to match (e.g., at least over some degree of certainty) the image of the third-party website to an image of the item within the electronic catalog, the item identification module 510 may associate the third-party content with an item identifier corresponding to the item depicted in the image. Similar techniques may be utilized for other types of visual representations provided in the third-party website such as videos or other 2D representations and/or 3D representations.

As yet another example, the item identification module 510 may analyze textual data of the third-party website to identify that the third-party website describes, references, and/or relates to a particular item offered within the electronic catalog (e.g., based on comparing the textual data to textual data associated with the item offered within the electronic catalog such as one or more item attributes associated with the item and stored within the first-party data store 106). If the item identification module 510 is able to match (e.g., at least over some degree of certainty) the textual data of the third-party website to textual data associated of the item of the electronic catalog, the item identification module 510 may associate the third-party content with an item identifier of the corresponding item. The item identification module 510 may maintain these associations in any suitable manner. As a non-limiting example, a mapping (e.g., as depicted at 114 of FIG. 1) may be maintained. In some embodiments, this mapping may include associations between a third-party website identifier, a set of categories (e.g., any suitable number of categories identified during categorization process 310), a set of items (e.g., any suitable number of item identified during item matching process 318), and the corresponding third-party website content. This mapping may be stored, for example, in the third-party data store 108 and/or the first-party data store 106 or at any suitable storage location accessible to the modules 502.

It should be appreciated that, in some embodiments, an exact item match may not be discovered. In some embodiments, as part of the item matching process 318, the item identification module 510 may be configured to identify one or more items from the electronic catalog that may be similar to an item described and/or depicted in the third-party content. As a non-limiting example, the third-party content may depict an image (or other visual representation) of a sofa. If an exact match to an item in the catalog is not found, the item identification module 510 may perform an additional process for determining similar items. As a non-limiting example, the item identification module 510 may be utilized to identify an object (e.g., a couch, a table, a bedframe, etc.) and/or one or more attributes of the object depicted (e.g., a color, dimensions, a style, a fabric, etc.) from the third-party content (e.g., an image, a video, and/or a 3D model of the third-party content). The item identification module 510 may attempt to identify visual representations of the electronic catalog that may depict items having similar attributes as the object depicted. In some embodiments, if an exact item match is not found but a number of similar items are identified, any suitable number of the similar items may be associated with the third-party website. In some embodiments, these similar items may be ranked by the item identification module 510 according to any suitable similarity score that quantifies a degree of similarity between the object/attributes of the third-party image and the item attributes associated with the item of the electronic catalog.

In some embodiments, the item identification module 510 may be configured to filter one or more items from a set of similar items based at least in part on particular item attributes. For example, in some embodiments, the item identification module 510 may analyze textual data associated with the third-party content to identify that the content relates to a particular item type (e.g., furniture, sofas, nightstands, kitchen mixers, etc.) and/or a particular brand (e.g., brand X, brand Y, etc.). If so, any items that were included in the set of similar items that do not share these attributes may be filtered from the set before the items of the set are associated with the third-party website. As a non-limiting example, the item identification module 510 may determine that third-party content includes an image of a sofa that is determined, via analysis of the textual data surrounding the image, to depict a brand Z sofa. If the item identification module 510 compares the image to all or some portion of the images (or other visual representations) in the electronic catalog and an exact match is not found, the item identification module 510 may analyze the image to identify one or more attributes and then search the first-party data store 106 for images (or other visual representations) of items that share at least one of those attributes. In some embodiments, this may return a set of items having a variety of differing attributes. The item identification module 510 may be configured to remove any items from the set that are not the same product type (e.g., sofa) as the object depicted/referenced in the third-party website. Additionally, or alternatively, the item identification module 510 may be configured to remove any items from the set that are not the same brand (e.g., brand Z) as the object depicted/referenced in the third-party website. Accordingly, in some embodiments, only items that share a product type and/or brand may be included in the set of similar items then associated with the third-party website. It should be appreciated that product type and brand are utilized for illustrative purposes and that any suitable attribute(s) of the item may be utilized to filter the set of similar items prior to associating the set with the third-party website. Similar techniques may be utilized when the third-party website features any suitable type and/or combination of visual representations.

The item identification module 510 may store the exact item match association and/or the associations to the set of similar items to the third-party website in any suitable storage location. By way of example, an item identifier for the exact match and/or a set of identifiers for the similar items may be associated with the third-party website and stored in mapping contained in the third-party data store 108, the first-party data store 106, or in any suitable storage container and/or location.

The query processing module 512 may be configured to receive a search query (e.g., from the data processing module 504). In some embodiments, the search query may be provided via any suitable interface provided by the interface manager 516. By way of example, the query process 325 of FIG. 3 may be performed by the query processing module 512 to identify relevance search results for a user-defined query.

The query processing module 512 may retrieve the third-party content and/or any suitable associations between the corresponding third-party websites, one or more categories, one or more matched item identifiers, one or more similar item identifiers, or any suitable combination of the above (e.g., the third-party content and/or the mapping discussed above as stored in the third-party data store 108).

The query processing module 512 may utilize the search query to identify a set of third-party websites from the third-party data which may be relevant to the search query. By way of example, any suitable combination of one or more keywords of the search query may be utilized to identify one or more third-party websites of the third-party data retrieved that have been previously associated with a category that relates to those keywords. The query processing module 512 may be configured to execute any suitable relevancy scoring process to score each of the websites according to the content retrieved from the third-party data store 108 as having some degree of relevancy to the search query. In some embodiments, the third-party websites having a score under a threshold value may be excluded from a list of search results to be provided in response to the query. In still further embodiments, the third-party websites included in the search results may be ranked by the query processing module 512 according to the relevancy score. The relevancy score may quantify an amount of relevancy between one or more keywords of the search query and any suitable combination of the textual data, visual representation data, and/or hyperlink data of the third-party website. The query processing module 512 may be configured to rank a website as being more relevant to the query based at least in part on having more terms that are similar to the search query than other third-party websites. The website may be additionally or alternatively ranked higher than the other websites based at least in part on how many items (e.g., exact and/or similar) that are associated with the website (e.g., websites having a greater number of associated items receiving a higher ranking than those with a lesser number of associated items). In some embodiments, a relevancy between the associated items and the query may be additionally conducted and the relevancy of the third-party website with respect to the query may be altered based on the relevancy determined between the query and the items associated with the third-party website. Said another way, a third-party website having associations with two items that are also deemed to have a high degree of relevance with respect to the query may be ranked higher than a third-party website having two or more associations with items having a lower degree of relevance to the search query.

It should be appreciated that, in some embodiments, information associated with the user (or many users of the electronic catalog) may be utilized by the query processing module 512, at least in part, to calculate a relevancy score. By way of example, historical data such as past purchase information, browsing data indicating searches and/or viewed items, shopping cart data indicating items placed in a shopping cart, saved items and/or wish list items, return order history, or any suitable user interaction with the electronic catalog and/or features thereof may be utilized, at least in part, to calculate a relevancy score between a search query and an item. As a simplistic example, when the user has previously viewed particular item detail pages within the electronic catalog, the query processing module 512 may utilize the information to calculate a higher relevancy score for third-party websites that depict those items. Similarly, a third-party website may be associated with a relatively higher relevancy score when it depicts an item that is similar (e.g., the same brand) as one or more items purchased by the user in the past. Historical data associated with other users of the electronic catalog may be utilized by the query processing module 512 in a similar manner. For example, third-party website may be deemed more relevant to some degree when they depict items that are more popular in the electronic catalog than others (e.g., items that are viewed more often than other items, items that are purchased more often than others, etc.). In a similar manner, when a third-party website depicts one or more items that are often returned (e.g., by the user and/or other users of the electronic catalog), the relevancy score may be negatively affected (e.g., lowered) to some degree. By utilizing this additional data to calculate the relevancy score, the system is configured to further tailor the search results to rank third-party web sites higher or lower to some degree based on a determination that they depict similar items with which the user(s) have interacted previously. These techniques can provide a more accurate assessment of relevancy than if that data was not used.

The query processing module 512 may generate search results including any suitable number of third-party websites and, if available, item visual representations corresponding to any suitable number of related items references and/or depicted in those sites. The visual representations provided in the search results may be obtained from visual representations contained in the first-party data store 106 such as visual representations utilized in item detail pages of the electronic catalog. This information may be provided by the query processing module 512 to the interface manager 516, which in turn may present the information via the interfaces 110 and/or 202 of FIGS. 1 and 2, respectively, in the manner described above with respect to FIGS. 1 and 2. In some embodiments, the query processing module 512 may generate and/or obtain (e.g., from another system and/or component of the service provider computer(s) 104) an additional set of search results by performing traditional search query processing utilizing the search query and the item information associated with the items of the electronic catalog as stored in the first-party data store 106. This additional set of search results may be generated and/or obtained without utilizing the third-party data stored in the third-party data store 108.

According to some embodiments, the interface manager 516 may be configured to provide one or more user interfaces with which one or more sets of search results may be presented. By way of example, the interface manager 516 may present the interfaces 110 and/or 202 of FIGS. 1 and 2, along with the corresponding interface elements discussed above in connection with those figures (e.g., tabs, buttons, edit boxes, navigational elements, etc.). The interface manager 516 may be configured to present different search results based at least in part on an option selected by the user. As a non-limiting example, the search query may be utilized in a conventional manner by the query processing module 512 (or another component of the service provider computer(s) 104) to identify a set of items within the electronic catalog based solely on the search query and traditional techniques of identifying relevant search query results. These traditional search results may be provided by the interface manager 516 within a tab, a page, an area of a webpage designated for provided results of this type. By way of example, the interface manager 516 may present these traditional search results within a separate tab and the user may opt to view these search results by selecting option 118 of FIG. 1.

The interface manager 516 may present any suitable data in the enhanced search result list such as a third-party website identifier (e.g., a title provided in the third-party website and/or a URL identifying the third-party website), one or more item identifiers (e.g., a textual identifier such as a name and/or item number associated with the item, one or more visual representations associated with the item and obtained from the electronic catalog, etc.), and the like. In some embodiments, the interface manager 516 may be configured format the visual representation (e.g., an image) obtained from the electronic catalog (e.g., from the first-party data store 106) to be presented as a thumbnail initially. The thumbnail may be provided adjacent (e.g., above, below, to the side, etc.) to the other data discussed above. In response to receiving user input indicating at least one of the thumbnails has been selected, the interface manager 516 may be configured to provide a graphical carousel, a grid, a slideshow, or the like including an enlarge version of at least one visual representation of an item originally depicted as a thumbnail. In some embodiments, the interface manager 516 may be configured to provide interface elements that enable a user to swipe or otherwise navigate to the left, right, up, or down to view additional visual representations of items of the set associated with a third-party website. Additional interface elements may be utilized to enable the user to revert to the thumbnail view. In some embodiments, the interface manager 516 may be configured to provide navigational links (e.g., a button corresponding to a hyperlink) and/or item information (e.g., an item identifier, an item name, an item description with the visual representation of the item within the viewing area (e.g., within the carousel, within the grid) and positioned adjacent to the visual representation so as to be readily apparent that it is associated with the visual representation provided. Upon receiving an indication that the navigational link has been selected, the interface manager 516 may be configured to navigate to an associated webpage (e.g., an item detail page) associated with the selection. In this manner, the user may navigate to an item detail page within the electronic catalog that corresponds to an item that was determined to be featured (or similar to an item featured) within the third-party website.

Figure 6:
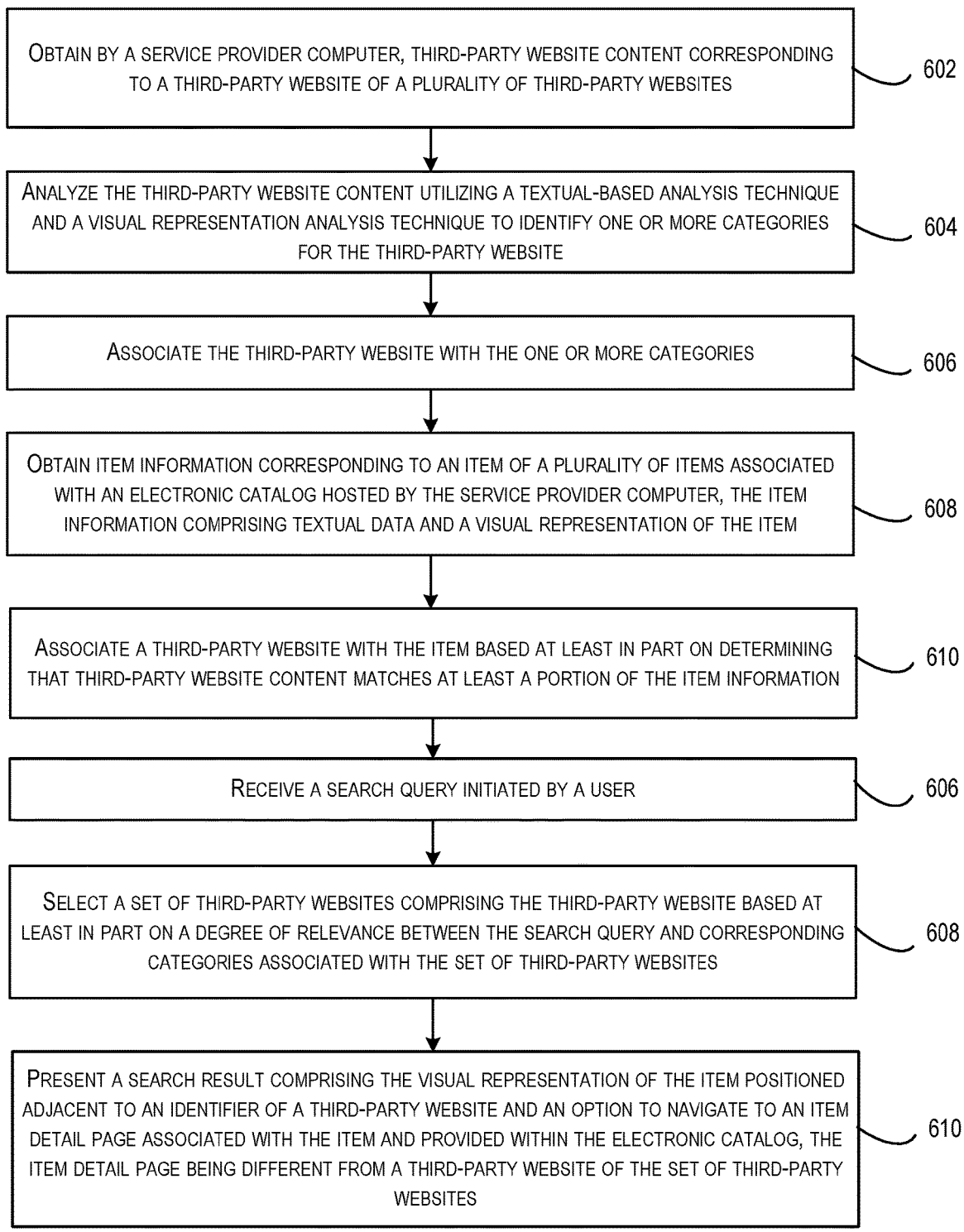
FIG. 6 is a flowchart illustrating an example method for providing a search result utilizing the enhanced search engine, in accordance with at least one embodiment.

FIG. 6 is a flowchart illustrating an example method 600 for providing a search result utilizing the enhanced search engine 102 of the figures above, in accordance with at least one embodiment. The operations described in connection with method 600 may be performed by the enhanced search engine 102. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by any suitable combination of the modules 502 of the enhanced search engine 102 of FIG. 5 which may operate in whole or in part at the service provider computer(s) 104 of FIG. 4.

The method 600 may begin at 602, where third-party website content corresponding to a third-party website of a plurality of third-party websites may be obtained (e.g., by the data collection module 506, a component of the enhanced search engine 102, which itself is a component of the service provider computer(s) 104). As discussed above the third-party website content may include any suitable data such as textual data, visual representation data (e.g., image data, video data, 3D data, 2D data, etc.), hyperlink or the link included within any suitable third-party website (e.g., any suitable number of webpages of a third-party website). These third-party websites may be identifying from a predetermined and/or user defined list of websites. The third-party website content may be obtained (and/or updated) utilizing a predetermined and/or user-defined periodicity and/or schedule.

At 604, the third-party website content may be analyzed (e.g., by the categorization module 508 of FIG. 5) utilizing any suitable textual-based analysis technique and/or visual representation analysis technique (e.g., image recognition techniques, video processing techniques, 3D modeling techniques, 2D/3D data conversion techniques, etc.) to identify one or more categories for the third-party website. Once identified, the categorization module 508 may associated with third-party website with the one or more categories at 606. As a non-limiting example, the categorization module 508 may generate a mapping (as depicted in the table 114 of FIG. 1) to store associations between the third-party website and the one or more categories.

At 608, item information may be obtained, the item information corresponding to an item of a plurality of items associated with an electronic catalog hosted by the service provider computer. In some embodiments, the item information may comprise textual data and an visual representation of the item (e.g., an image). This item information may be obtained from the first-party data store 106 described in the above figures.

At 610, a third-party website may be associated with the item (e.g., by the categorization module 508) based at least in part on determining that third-party website content matches at least a portion of the item information.

At 612, a search query may be received. The search query may be initiated by a user (e.g., utilizing an interface provided by the interface manager 514 of FIG. 5).

At 614, a set of third-party websites comprising the third-party website may be selected (e.g., by the query processing module 512 of FIG. 5) based at least in part on a degree of relevance between the search query and corresponding categories associated with the set of third-party websites.

At 616, a search result comprising the visual representation (e.g., an image) of the item may be presented (e.g., by the interface manager 516) as being positioned adjacent to an identifier of a third-party website. An option to navigate to an item detail page associated with the item and provided within the electronic catalog may also be presented. In some embodiments, the item detail page may be different from a third-party website of the set of third-party websites. For example, the item detail page may be associated with the service provider that hosts the electronic catalog of items.

Figure 7:
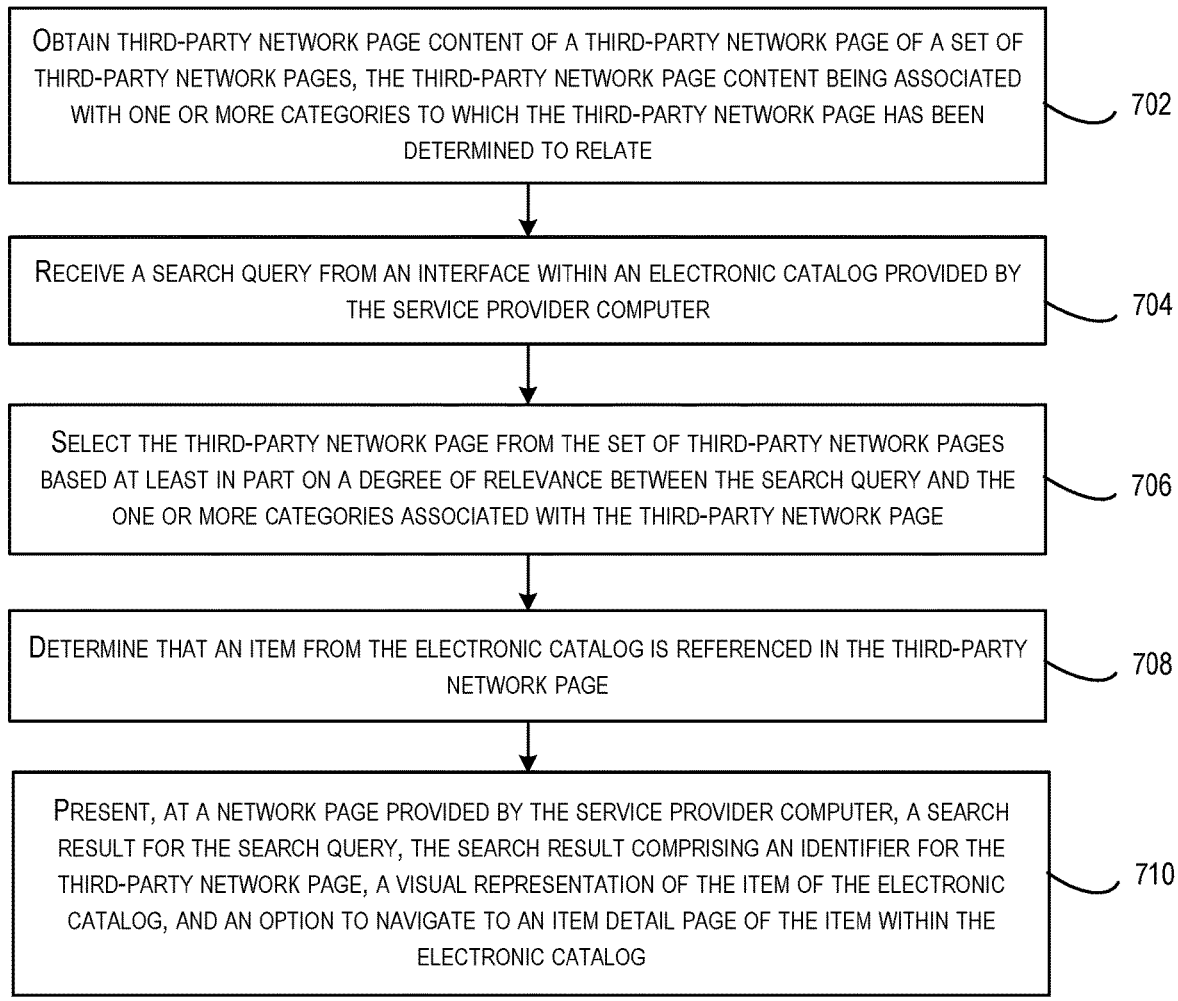
FIG. 7 is another flowchart illustrating another example method for providing a search result utilizing the enhanced search engine, in accordance with at least one embodiment.

FIG. 7 is another flowchart illustrating another example method 700 for providing a search result utilizing the enhanced search engine 102 of the figures above, in accordance with at least one embodiment. The operations of method 700 may be performed by a service provider computer (e.g., the service provider computer(s) 104) having one or more processors and one or more memories storing executable instructions that, when executed by the one or more processors, cause the service provider computer(s) 104 to perform the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 502 of the enhanced search engine 102 of FIG. 5 which may operate in whole or in part on at the service provider computer(s) 104 of FIG. 4.

The method 700 may begin at 702, where third-party network page content of a third-party network page of a set of third-party network pages may be obtained (e.g., by the query processing module 512 of FIG. 5). In some embodiments, the third-party network page content may be (previously) associated (e.g., by the categorization module 508 of FIG. 1) with one or more categories to which the third-party network page has been determined to relate.

At 704, a search query may be received (e.g., by the query processing module 512) from an interface within an electronic catalog provided by the service provider computer (e.g., an interface provided by the interface manager 516 of FIG. 5).

At 706, the third-party network page may be selected (e.g., by the query processing module 512) from the set of third-party network pages based at least in part on a degree of relevance between the search query and the one or more categories associated with the third-party network page. The query processing module 512 may execute any suitable relevancy scoring scheme to determine a degree to which each third-party network page relates to the search query provided as described above.

At 708, an item may be determined (e.g., by the query processing module 512) from the electronic catalog as being referenced in the third-party network page. In some embodiments, the query processing module 512 may determine the item based at least in part on the item identifiers associated with the third-party network page.

At 710, a search result for the search query may be presented (e.g., by the interface manager 516) at a network page provided by the service provider computer (e.g., a network page including the interface 110 and/or interface 202 of FIGS. 1 and 2, respectively). In some embodiments, the search result comprising an identifier for the third-party network page, a visual representation of the item of the electronic catalog, an option to navigate to an item detail page of the item within the electronic catalog, any suitable item information of the item associated with the network page, and/or any suitable information provided in or associated with the third-party network page.

Figure 8:
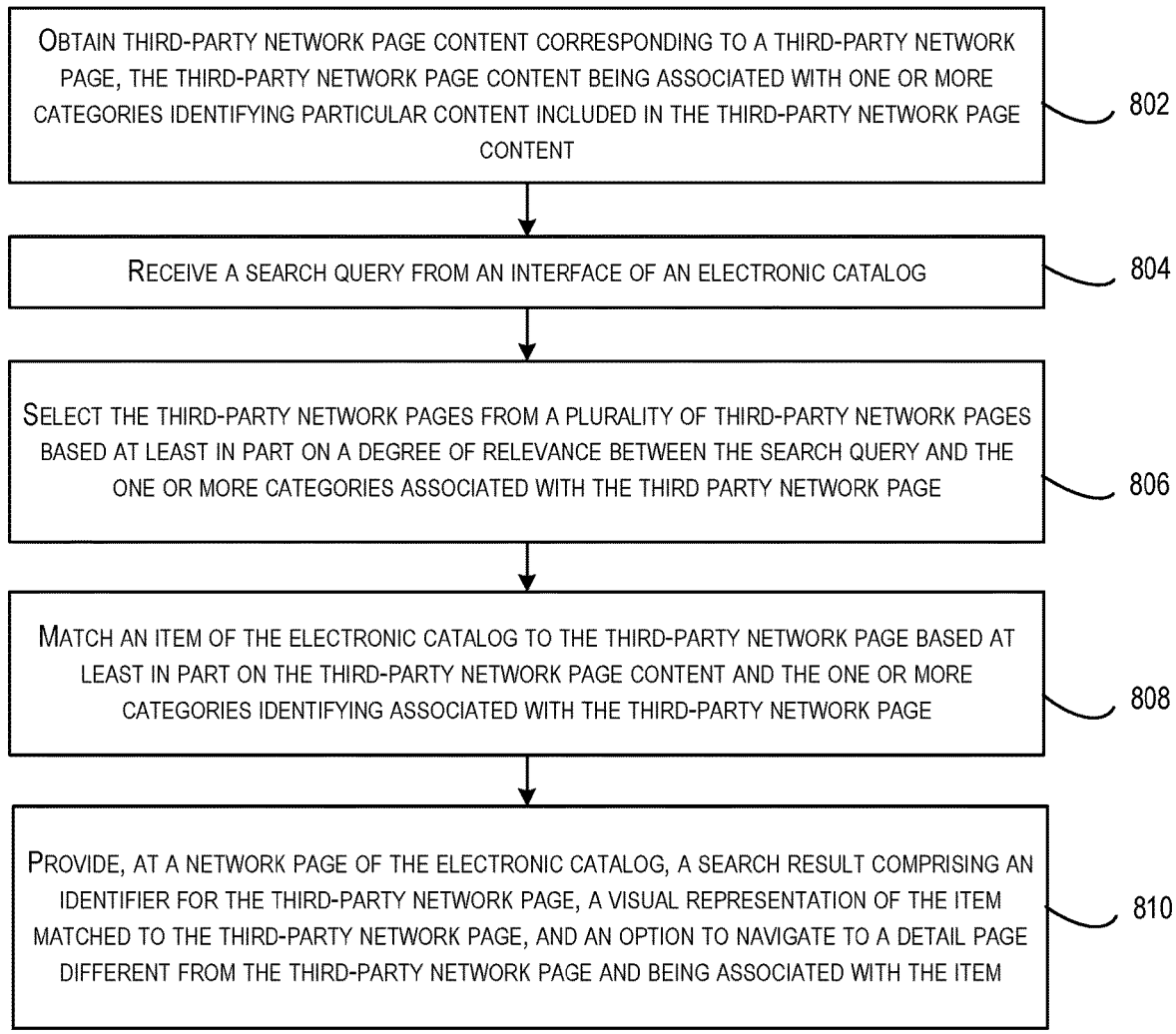
FIG. 8 is yet another flowchart illustrating yet another example method for providing a search result utilizing the enhanced search engine, in accordance with at least one embodiment.

FIG. 8 is yet another flowchart illustrating yet another example method 800 for providing a search result utilizing the enhanced search engine 102 of the figures above, in accordance with at least one embodiment. A computer-readable medium may store computer-executable instructions that, when executed by at least one processor, cause a service provider computer (e.g., the service provider computer(s) 104 of the figures above) to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 502 of the enhanced search engine 102 of FIG. 5 which may operate in whole or in part at the service provider computer(s) 104 of FIG. 4.

The method 800 may begin at 802, where third-party network page content corresponding to a third-party network page may be obtained (e.g., by the query processing module 512 of FIG. 5). In some embodiments, the third-party network page content may be (previously) associated (e.g., by the categorization module 508 of FIG. 1) with one or more categories to which the third-party network page has been determined to relate. In some embodiments, the third-party network page content may be associated with one or more categories identifying particular content included in the third-party network page content.

At 804, a search query may be received (e.g., by the query processing module 512) from an interface of an electronic catalog (e.g., an interface provided by the interface manager 516 of FIG. 5 such as interface 110 and/or 202 of FIGS. 1 and 2, respectively).

At 806, the third-party network page may be selected (e.g., by the query processing module 512) from the plurality of third-party network pages based at least in part on a degree of relevance between the search query and the one or more categories associated with the third-party network page. The query processing module 512 may execute any suitable relevancy scoring scheme to determine a degree to which each third-party network page relates to the search query provided as described above.

At 808, an item of the electronic catalog may be matched (e.g., by the categorization module 508, by the query processing module 512, etc.) from the electronic catalog as being referenced in the third-party network page. In some embodiments, the query processing module 512 may determine the item based at least in part on the item identifiers associated (e.g., by the categorization module 508) with the third-party network page.

At 810, a search result for the search query may be provided (e.g., by the interface manager 516) at a network page of the electronic catalog (e.g., a network page including the interface 110 and/or interface 202 of FIGS. 1 and 2, respectively). In some embodiments, the search result may comprise an identifier for the third-party network page, a visual representation of the item (e.g., an image) matched to the third-party network page, an option to navigate to an detail page different from the third-party network page and being associated with the item. In some embodiments, any suitable item information of the item associated with the network page, and/or any suitable information provided in or associated with the third-party network page may be presented within the interface provided (e.g., by the interface manager 516).

Figure 9:
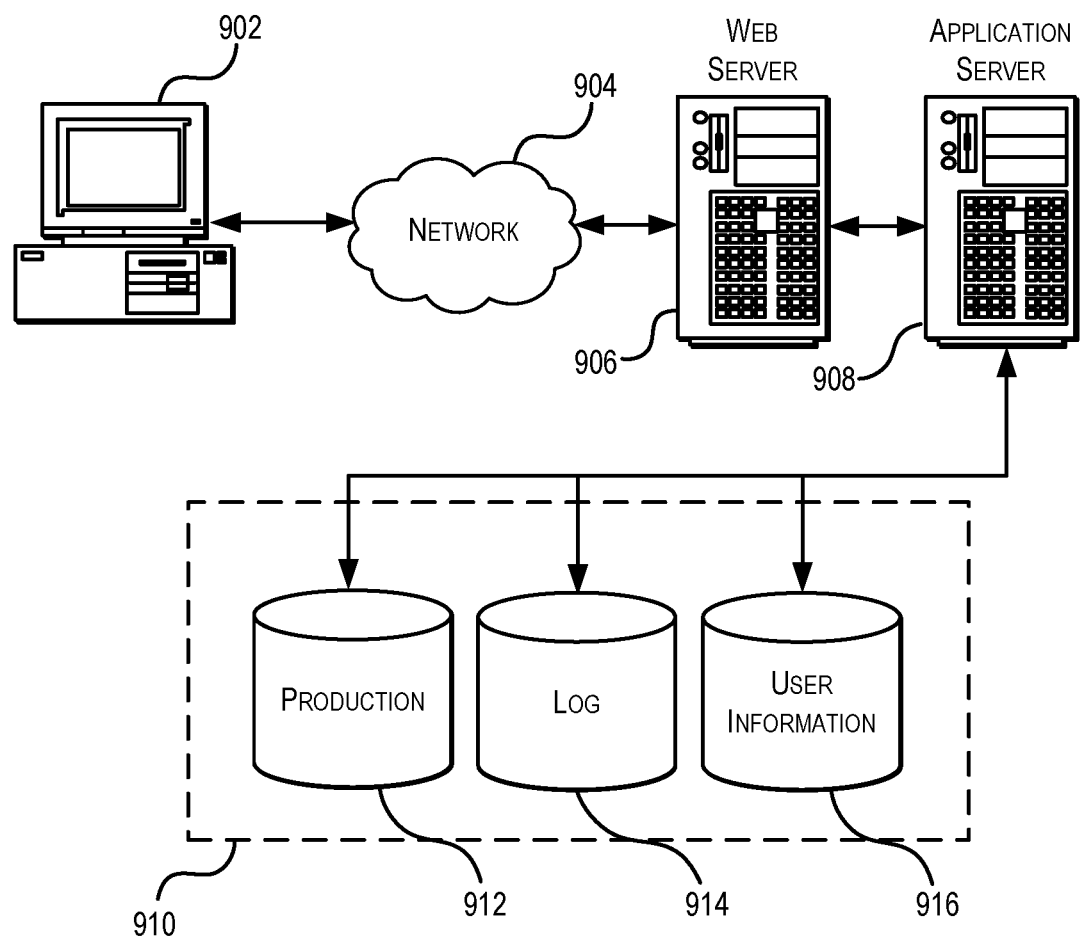
FIG. 9 illustrates aspects of an example environment for implementing aspects in accordance with various embodiments.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page visual representation information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    obtaining, by a service provider computer, third-party website content corresponding to a third-party website of a plurality of third-party websites, the service provider computer hosting an electronic catalog from which a plurality of items are offered;
    analyzing, by the service provider computer, the third-party website content utilizing a textual-based analysis technique and a visual representation analysis technique to identify one or more categories for the third-party website;
    associating, by the service provider computer, the third-party website with the one or more categories;
    obtaining, by the service provider computer, item information corresponding to an item of the plurality of items associated with the electronic catalog hosted by the service provider computer, the item information comprising textual data and a visual representation of the item;
    comparing, by the service provider computer, the third-party website content and the item information to identify whether the third-party website content features information related to the item of the electronic catalog;
    associating, by the service provider computer, the third-party website with the item based at least in part on identifying that the third-party website content features the information related to the item of the electronic catalog;

receiving, at an interface of the electronic catalog, a search query initiated by a user;

selecting, by the service provider computer, a set of third-party websites comprising the third-party website based at least in part on a degree of relevance between i) keywords identified from the search query received at the interface of the electronic catalog hosted by the service provider computer and ii) the one or more categories associated with each of the set of third-party websites and identified utilizing the textual-based analysis technique and the visual representation analysis technique; and presenting, at the interface of the electronic catalog hosted by the service provider computer, a search result comprising the visual representation of the item positioned adjacent to an identifier of the third-party website and an option to navigate to an item detail page associated with the item and provided within the electronic catalog hosted by the service provider computer, the item detail page being different from the third-party website of the set of third-party websites.

2. The method of claim 1, wherein comparing the third-party website content and the item information comprises comparing first textual data of the third-party website content and second textual data of the item information.

3. The method of claim 1, wherein comparing the third-party website content and the item information comprises comparing first visual representation data of the third-party website content and second visual representation data of the item information.

4. The method of claim 1, wherein identifying that the third-party website content features the information related to the item of the electronic catalog comprises providing visual representation data of the third-party website content to a previously-trained machine-learning model, and receiving output indicating the item is depicted in the visual representation data.

5. The method of claim 1, wherein determining the degree of relevance between the search query and the plurality of third-party websites comprises comparing a first set of terms of the search query to the one or more categories associated with each of the plurality of third-party websites.

6. The method of claim 1, wherein identifying that the third-party website content features the information related to the item of the electronic catalog is based at least in part on determining, utilizing an visual representation analysis algorithm, that the item is featured in the third-party website content.

7. The method of claim 1, wherein the search result is provided within a website comprising the electronic catalog and hosted by the service provider computer.

8. The method of claim 1, further comprising:

identifying a set of items from the electronic catalog based at least in part on a first degree of relevance between the search query and one or more attributes of each of the set of items;

presenting, at a network page provided by the service provider computer, a first option to view a first set of search results corresponding to the set of items and a second option to view a second set of search results corresponding to the third-party website;

receiving user input indicating selection of the second option to view the second set of search results corresponding to the third-party website; and presenting the second set of search results in response to receiving the user input, the second set of search results comprising the search result.

9. A service provider computer, comprising:

one or more processors; and one or more memories storing executable instructions that, when executed by the one or more processors, cause the service provider computer to:

host an electronic catalog from which a plurality of items are offered;

obtain third-party network page content to a third-party network page of a set of third-party network pages, the third-party network page content being associated with one or more categories to which the third-party network page has been determined to relate;

receive a search query from an interface within the electronic catalog provided by the service provider computer;

identify a set of items from the plurality of items offered in the electronic catalog based at least in part on a first degree of relevance between the search query and one or more attributes of each of the set of items;

select the third-party network page from the set of third-party network pages based at least in part on a degree of relevance between the search query and the one or more categories to which the third-party network page has been determined to relate;

determine that an item from the electronic catalog hosted by the service provider computer is referenced in the third-party network page;

present, at a network page provided by the service provider computer, a first option to view a first set of search results corresponding to the set of items and a second option to view a second set of search results corresponding to the third-party network page; and in response to receiving user input selecting the second option, present a search result for the search query, the search result comprising an identifier for the third-party network page, a visual representation of the item of the electronic catalog, and an option to navigate to an item detail page of the item within the electronic catalog.

10. The service provider computer of claim 9, wherein executing the executable instructions further causes the service provider computer to:

receive an indication that the visual representation of the item has been selected;

modify the interface to depict an enlarged visual representation of the item, the option to navigate to the item detail page being positioned adjacent to the enlarged visual representation, wherein receiving the indication that the option was selected causes the network page to be replaced with to the item detail page associated with the item.

11. The service provider computer of claim 9, wherein executing the executable instructions further causes the service provider computer to:

obtaining a machine-learning model that has been previously trained to identify categories discussed or depicted within input content;

providing, to the machine-learning model, input content from the third-party network page of the set of third-party network pages;

receiving output indicating one or more categories discussed or depicted within the input content; and associating the third-party network page with the one or more categories received; and storing the association between the third-party network page and the one or more categories for subsequent processing.

12. The service provider computer of claim 9, wherein the search query includes one or more objective terms.

13. The service provider computer of claim 12, wherein the one or more categories associated with the third-party network page comprise at least one of the one or more objective terms of the search query.

14. The service provider computer of claim 9, wherein the one or more categories comprise at least one of an item name, an item type, an item brand, or an item attribute.

15. A computer-readable storage medium comprising executable instructions that, upon execution by one or more processors, cause the one or more processors to perform operations comprising:

hosting an electronic catalog from which a plurality of items are offered;

obtaining third-party network page content corresponding to a third-party network page, the third-party network page content being associated with one or more categories identifying particular content included in the third-party network page content:

receiving a search query from an interface of the electronic catalog;

identifying a set of items from the plurality of items offered in the electronic catalog based at least in part on a first degree of relevance between the search query and one or more attributes of each of the set of items;

selecting the third-party network page from a plurality of third-party network pages based at least in part on a degree of relevance between the search query and the one or more categories associated with the third-party network page;

matching an item of the electronic catalog to the third-party network page based at least in part on the third-party network page content and the one or more categories identifying associated with the third-party network page;

presenting, at a network page of the electronic catalog, a first option to view a first set of search results corresponding to the set of items and a second option to view a second set of search results corresponding to the third-party network page; and in response to receiving user input selecting the second option, present a search result comprising an identifier for the third-party network page, a visual representation of the item matched to the third-party network page, and an option to navigate to a detail page within the electronic catalog and associated with the item, the detail page being different from the third-party network page.

16. The computer-readable storage medium of claim 15, wherein matching the item of the electronic catalog to the third-party network page comprises:

comparing item attributes associated with the item to the one or more categories associated with the third-party network page; and identifying that at least one item attribute associated with the item matches a category of the one or more categories.

17. The computer-readable storage medium of claim 15, wherein matching the item of the electronic catalog to the third-party network page comprises:

obtaining, from the electronic catalog, a first visual representation of the item;

obtaining a second visual representation from the third-party network page content; and identifying that the third-party network page depicts the item based at least in part on comparing the first visual representation of the item from the electronic catalog to the second visual representation obtained from the third-party network page content.

18. The computer-readable storage medium of claim 15, wherein matching the item of the electronic catalog to the third-party network page comprises identifying that the third-party network page content contains a hyperlink that identifies the detail page associated with the item.

19. The computer-readable storage medium of claim 15, wherein the visual representation is provided as a thumbnail image, and wherein the operations performed further comprise:

receiving an indication that the thumbnail image has been selected; and providing a viewing area comprising an enlarged version of the thumbnail image based at least in part on the indication, wherein the option to navigate to the detail page is providing within the viewing area.

20. The computer-readable storage medium of claim 15, wherein the operations performed further comprise:

identifying that a search option has been selected, wherein identifying that the search option was selected causes the search result to be identified using third-party network pages instead of identifying a different search result utilizing only item detail pages of the electronic catalog.

* * * * *